United States Patent
Lattanzio et al.

(10) Patent No.: US 10,684,631 B2
(45) Date of Patent: *Jun. 16, 2020

(54) MEASURING AND DETERMINING HOT SPOTS IN SLIDE VALVES FOR PETROCHEMICAL PLANTS OR REFINERIES

(71) Applicant: UOP LLC, Des Plaines, IL (US)

(72) Inventors: Louis A. Lattanzio, Mount Prospect, IL (US); Alex Green, Palatine, IL (US); Matthew R. Wojtowicz, Carpentersville, IL (US); Ian G. Horn, Streamwood, IL (US)

(73) Assignee: UOP LLC, Des Plaines, IL (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/851,360

(22) Filed: Dec. 21, 2017

(65) Prior Publication Data

US 2018/0275692 A1   Sep. 27, 2018

Related U.S. Application Data

(60) Provisional application No. 62/477,288, filed on Mar. 27, 2017.

(51) Int. Cl.
*G01K 3/10* (2006.01)
*G01K 3/14* (2006.01)
(Continued)

(52) U.S. Cl.
CPC ............. *G05D 7/0635* (2013.01); *G01K 3/10* (2013.01); *G01K 3/14* (2013.01); *G01K 13/00* (2013.01);
(Continued)

(58) Field of Classification Search
CPC ...... C10G 1/008; C10G 11/187; G05B 15/00; G05B 15/02; G05B 19/4065; G05D 7/00; C10J 3/723
See application file for complete search history.

(56) References Cited

U.S. PATENT DOCUMENTS 5,077,252 A * 12/1991 Owen .................... C10G 11/18
208/113
6,392,114 B1 * 5/2002 Shields ..................... C07C 2/58
585/712

(Continued)

FOREIGN PATENT DOCUMENTS

WO   2001060951 A1   8/2001

OTHER PUBLICATIONS

Jul. 12, 2018—(EP) International Search Report—App PCT/US2018/024544.

*Primary Examiner* — Ronald D Hartman, Jr.

(57) ABSTRACT

A plant or refinery may include equipment such as condensers, regenerators, distillation columns, pumps, slide valves, or the like. Different operating methods may impact deterioration in equipment condition, thereby prolonging equipment life, extending production operating time, or providing other benefits. Mechanical or digital sensors may be used for monitoring equipment to determine whether problems are developing. Specifically, sensors may be used in conjunction with one or more system components to predict and detect slide valve hot spots. A shielded, tube skin thermocouple assembly may provide a temperature profile for a slide valve. Tomography may be used to image a slide valve. An operating condition of the plant or refinery may be adjusted to prolong equipment life or avoid equipment failure.

20 Claims, 18 Drawing Sheets

(51) Int. Cl.
*G01K 13/00* (2006.01)
*G05B 23/00* (2006.01)
*G05B 19/042* (2006.01)
*G01W 1/02* (2006.01)
*G05D 7/06* (2006.01)
*G05B 23/02* (2006.01)

(52) U.S. Cl.
CPC ............ *G01W 1/02* (2013.01); *G05B 19/042* (2013.01); *G05B 23/0259* (2013.01); *G05D 7/0605* (2013.01); *G01K 2003/145* (2013.01); *G05B 2219/25312* (2013.01)

(56) References Cited

U.S. PATENT DOCUMENTS

| | | | | |
|---|---|---|---|---|
| 7,567,887 | B2* | 7/2009 | Emigholz | C10G 11/18 702/182 |
| 2004/0099572 | A1* | 5/2004 | Evans | B01J 8/0035 208/113 |
| 2004/0109788 | A1 | 6/2004 | Li et al. | |
| 2005/0216209 | A1* | 9/2005 | Evans | B01J 8/0015 702/45 |
| 2007/0020154 | A1* | 1/2007 | Evans | B01J 8/003 422/139 |
| 2010/0108567 | A1* | 5/2010 | Medoff | C10G 3/00 208/49 |
| 2011/0152590 | A1 | 6/2011 | Sadler et al. | |
| 2011/0152591 | A1 | 6/2011 | Sadler et al. | |
| 2012/0104295 | A1* | 5/2012 | Do | G05B 9/03 251/129.01 |
| 2013/0090088 | A1 | 4/2013 | Chevsky et al. | |
| 2014/0114039 | A1 | 4/2014 | Benham et al. | |
| 2014/0163275 | A1 | 6/2014 | Yanagawa et al. | |
| 2014/0179968 | A1 | 6/2014 | Yanagawa et al. | |
| 2014/0212978 | A1* | 7/2014 | Sharpe, Jr. | G05B 23/0272 436/6 |
| 2014/0294683 | A1 | 10/2014 | Siedler | |
| 2014/0294684 | A1 | 10/2014 | Siedler | |
| 2014/0296058 | A1 | 10/2014 | Sechrist et al. | |
| 2015/0078970 | A1 | 3/2015 | Iddir et al. | |
| 2015/0098862 | A1 | 4/2015 | Lok et al. | |
| 2018/0155642 | A1* | 6/2018 | Al-Ghamdi | C10G 69/08 |

* cited by examiner

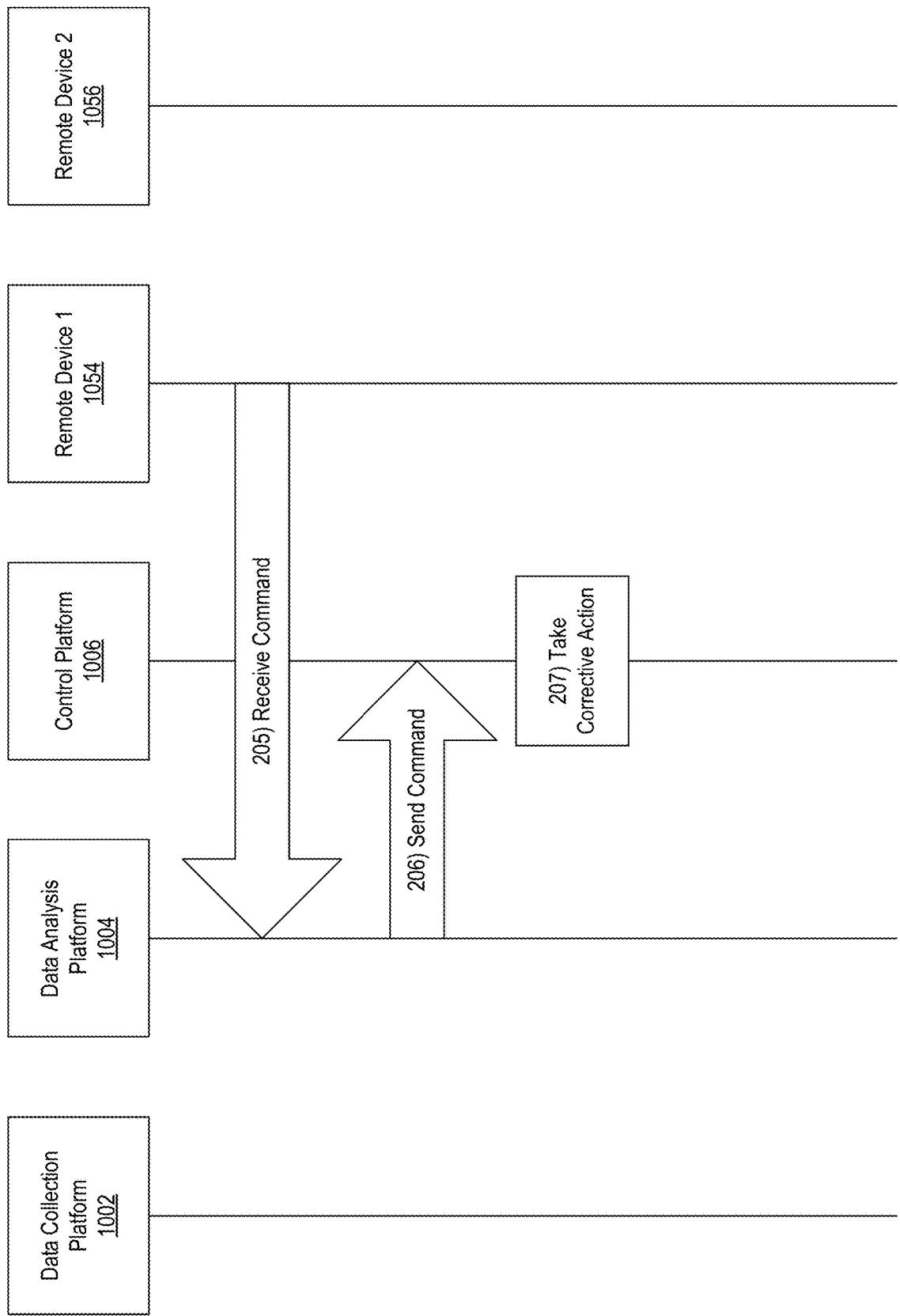

MEASURING AND DETERMINING HOT SPOTS IN SLIDE VALVES FOR PETROCHEMICAL PLANTS OR REFINERIES

CROSS-REFERENCE TO RELATED APPLICATION

This application claims the benefit of priority under 35 U.S.C. § 119(e) to U.S. Provisional Application No. 62/477,288, filed Mar. 27, 2017, which is incorporated by reference in its entirety.

FIELD

The present disclosure is related to a method and system for improving the performance of components that make up operations in a plant, such as a carbonaceous processing plant, a chemical plant, a petrochemical plant, or a refinery. Typical plants may be those that provide catalytic cracking or methanol oligomerization using a fluidized catalyst, or any refinery, petrochemical, or pyrolysis oil plant that circulates solids.

BRIEF DESCRIPTION OF DRAWINGS

The present disclosure is illustrated by way of example and not limited in the accompanying figures in which like reference numerals indicate similar elements and in which:

FIGS. 11A-11B depict an illustrative flow diagram of one or more steps that one more devices may perform in controlling one or more aspects of a plant operation in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A chemical plant or a petrochemical plant or a refinery may include one or more pieces of equipment that process one or more input chemicals to create one or more products. Fluidized catalytic cracking (FCC) can be used to convert heavy gasoils into lighter distillate, naphtha, and chemical products.

A multitude of process equipment may be utilized in the chemical, refining, and petrochemical industry including, but not limited to, slide valves, rotating equipment, pumps, compressors, heat exchangers, fired heaters, control valves, fractionation columns, reactors, and/or shut-off valves.

Elements of chemical and petrochemical/refinery plants may be exposed to the outside and thus can be exposed to various environmental stresses. Such stresses may be weather related, such as temperature extremes (hot and cold), high-wind conditions, and precipitation conditions such as snow, ice, and rain. Other environmental conditions may be pollution particulates, such as dust and pollen, or salt if located near an ocean, for example. Such stresses can affect the performance and lifetime of equipment in the plants. Different locations may have different environmental stresses. For example, a refinery in Texas may have different stresses than a chemical plant in Montana.

Process equipment may deteriorate over time, affecting the performance and integrity of the process. Such deteriorating equipment may ultimately fail, but before failing, may decrease efficiency, yield, and/or product properties. It is desirable that corrective actions be taken in advance of equipment inefficiencies and/or failure.

Figure 1:
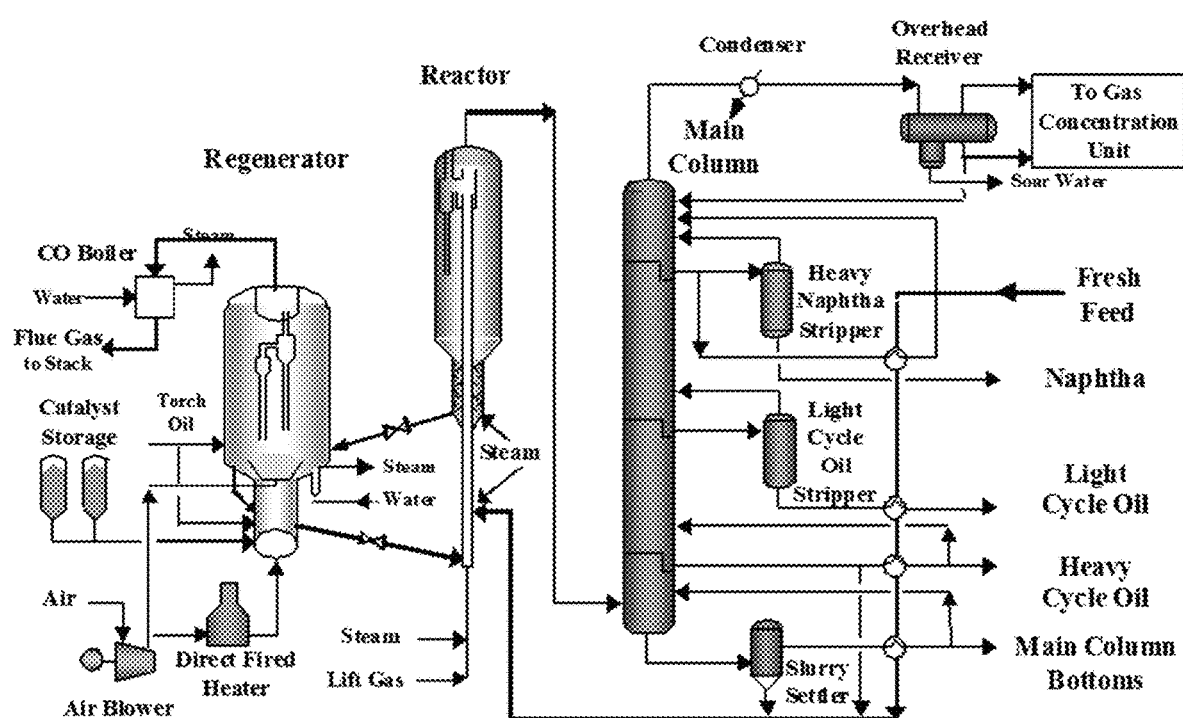
FIG. 1 depicts an illustrative arrangement for a fluid catalytic cracking process in accordance with one or more example embodiments.

FIG. 1 shows a typical fluid catalytic cracking (FCC) process, which includes an FCC fluidized bed reactor and a spent catalyst regenerator. Regenerated cracking catalyst entering the reactor, from the spent catalyst regenerator, is contacted with an FCC feed stream in a riser section at the bottom of the FCC reactor, to catalytically crack the FCC feed stream and provide a product gas stream, comprising cracked hydrocarbons having a reduced molecular weight, on average, relative to the average molecular weight of feed hydrocarbons in the FCC feed stream. As shown in FIG. 1, steam and lift gas are used as carrier gases that upwardly entrain the regenerated catalyst in the riser section, as it contacts the FCC feed. In this riser section, heat from the catalyst vaporizes the FCC feed stream, and contact between the catalyst and the FCC feed causes cracking of this feed to lower molecular weight hydrocarbons, as both the catalyst and feed are transferred up the riser and into the reactor vessel. A product gas stream comprising the cracked (e.g., lower molecular weight) hydrocarbons may be separated from spent cracking catalyst at or near the top of the reactor vessel, preferably using internal solid/vapor separation equipment, such as cyclone separators. This product gas stream, essentially free of spent cracking catalyst, then exits the reactor vessel through a product outlet line for further transport to the downstream product recovery section.

The spent or coked catalyst, following its disengagement or separation from the product gas stream, requires regeneration for further use. This coked catalyst first falls into a dense bed stripping section of the FCC reactor, into which steam is injected, through a nozzle and distributor, to purge any residual hydrocarbon vapors that would be detrimental to the operation of the regenerator. After this purging or stripping operation, the coked catalyst is fed by gravity to the catalyst regenerator through a spent catalyst standpipe. FIG. 1 depicts a regenerator, which can also be referred to as a combustor. Various configurations of regenerators may be used. In the spent catalyst regenerator, a stream of oxygen-containing gas, such as air, is introduced to contact the coked catalyst, burn coke deposited thereon, and provide regenerated catalyst, having most or all of its initial coke content converted to combustion products, including $CO_2$, CO, and $H_2O$ vapors that exit in a flue gas stream. The regenerator operates with catalyst and the oxygen-containing gas (e.g., air) flowing upwardly together in a combustor riser that is located within the catalyst regenerator. At or near the top of the regenerator, following combustion of the catalyst coke, regenerated cracking catalyst is separated from the flue gas using internal solid/vapor separation equipment (e.g., cyclones) to promote efficient disengagement between the solid and vapor phases.

In the FCC recovery section, the product gas stream exiting the FCC reactor is fed to a bottoms section of an FCC main fractionation column. Several product fractions may be separated on the basis of their relative volatilities and recovered from this main fractionation column. Representative product fractions include, for example, naphtha (or FCC gasoline), light cycle oil, and heavy cycle oil.

Other petrochemical processes produce desirable products, such as turbine fuel, diesel fuel and other products referred to as middle distillates, as well as lower boiling hydrocarbonaceous liquids, such as naphtha and gasoline, by hydrocracking a hydrocarbon feedstock derived from crude oil or heavy fractions thereof. Feedstocks most often subjected to hydrocracking are the gas oils and heavy gas oils recovered from crude oil by distillation. For example, the conversion of methanol to olefins (MTO) produces ethylene and propylene from natural gas or coal. MTO enables low costs of production for ethylene and propylene and produces olefins at high ratios of propylene to ethylene than other processes. Rapid thermal processing (RTP) (Ensyn's patented RTP® technology) utilizes renewable cellulosic biomass, typically wood-derived feedstocks, in a thermal conversion process that produces high yields of free-flowing liquid biocrude. The technology utilizes a process similar to the FCC process but circulates an inert sand heat carrier, instead of catalyst, to convert the biomass to a biocrude.

References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, operators, and others interested in, overseeing, and/or running the daily operations at a plant.

Slide Valves

Some plants may include one or more slide valves, which may be connected in series or in parallel with other pieces of equipment, and/or may be integrated directly into a particular piece of equipment. Slide valves may be used in gravity flow applications of dry material, such as catalysts aggregates (e.g., powder, pellets, or granulars). A slide valve system may be of a variety of constructions depending on the process and types of aggregates. For example, there are regenerated catalyst slide valves, spent catalyst slide valves, and recirculation catalyst slide valves. In addition, there are slide valves for gaseous streams, such as flue gas slide valves, which are typically double disc valves.

A typical slide valve system may include a valve body. Inside the body may be an actuator to control the valve, including a piston, an orifice plate support, and a movable disc to cover or uncover the orifice. The actuator is typically distinct from the slide valve body but mounted to it and coupled to it. The piston may operate to move the disc upon initiation by the actuator.

A disc is a movable obstruction inside a stationary valve body that adjustably restricts flow through the valve. Discs come in various shapes such as disc-shapes and rectangular shapes. The disc may be coated with concrete or ceramic or other refractory material to protect the disc. The disc generally closes and opens an orifice in a pipe or gravity feeder. Such orifice may be circular or rectangular. The diameter or width of the discs may be 6" to 48", typically 24" to 36" for petrochemical use. The valves may be operated to open or close the hole and/or may be used for volume metering.

Two discs may be used to block or allow flow for a gaseous stream, such as a flue gas slide valve.

Guides may be used to guide the discs between opened and closed positions. The guides may be positioned within the valve body adjacent the orifice plate support to guide the disc in a linear direction across the orifice.

An actuator is a mechanism or device to automatically or remotely control a valve under a source of power. The actuator may be controlled by electricity using a motor or a solenoid. For example, an integrated actuator may include an electromechanical solenoid. An electromechanical solenoid is a specific type of relay to operate an electrical switch to initiate action of a piston, for example.

The actuator may include a piston. A piston may be a pneumatic (pressurized air) or hydraulic (pressurized liquid) piston, and may be used to open or close the valve by pushing or pulling the disc into position. The actuator piston and associated instruments may be shielded from the effects of radiant heat. For example, a shield may be configured to protect the actuator piston such that the actuator piston temperature does not exceed a particular temperature (e.g., 150° F. (65° C.)). Alternatively or additionally, heating and/or cooling may be utilized, as required, to maintain satisfactory operation at ambient conditions. For example, a hydraulic fluid reservoir may be nitrogen gas blanketed.

An electro-hydraulic actuator assembly may be present for each valve in a process with individual hydraulic power sources. Double disc slide valves may share one hydraulic power source. The piston may be directly connected to the slide valve to minimize the effects of backlash. Backlash is a relative movement between connected mechanical parts, resulting from looseness, when motion is reversed. This is sometimes also referred to as slop, lost motion, or free play.

A stem, if present, may transmit motion from the controlling device (actuator/piston) to the disc. The stem may protrude through the bonnet when present. In some cases, the stem and the disc can be combined in one piece.

A bonnet may be attached to the valve body and may act as a cover to protect the valve stem. The bonnet may be threaded, bolted, or welded into the valve body. The bonnet may be removable for maintenance.

Valve components may be made of carbon steel (CS), stainless steel (SS), duplex & super duplex stainless steels, titanium, zirconium, Uranus® B6, tantalum, nickel, Hastelloy®, and/or Monel. Construction methods may include fabricated (welded), cast, and/or solid. Hot wall slide valves are typically chrome alloys (ex. 1¼" Cr-½ Mo).

A slide valve may be used under high and low pressure conditions, high and low temperature conditions, high abrasion, corrosive, and high viscosity conditions. In the petrochemical and related processes, such slide valves may be used for solids, such as catalysts.

Figure 2:
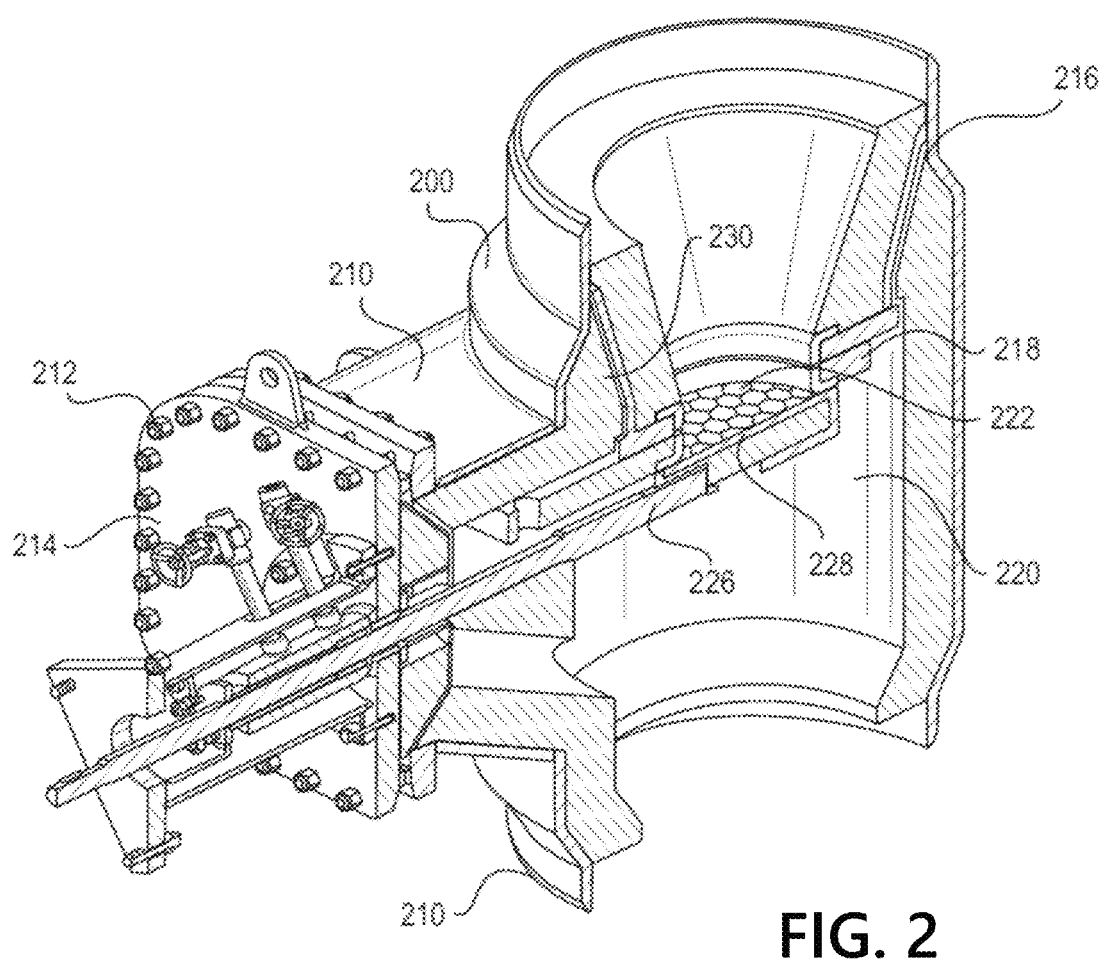
FIG. 2 depicts an illustrative cold wall slide valve in accordance with one or more example embodiments.

FIG. 2 depicts an example cold wall slide valve. Valve body 200 is surrounded by valve bonnet 210. Valve bonnet cover flange 214 is connected to bonnet 210 via external bolting 212. The disc 228 is positioned downstream of orifice 222. Valve stem 226 moves disc 228 along orifice plate support 218 to open and close orifice 222. A high density refractory lining 220 covers body 200 internal surfaces. Guides (not shown in this figure) may guide the disc as it moves in a linear direction to open and close the orifice.

Figure 3:
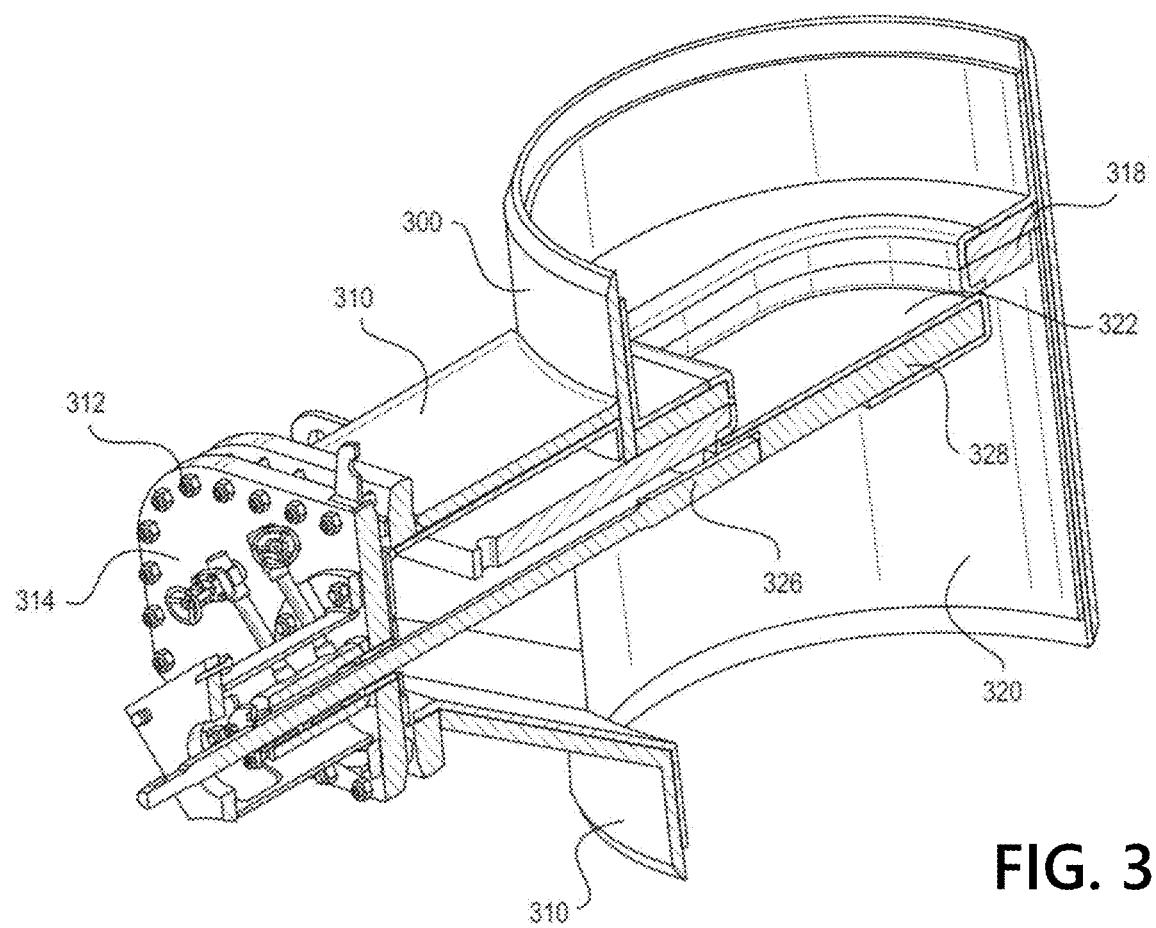
FIG. 3 depicts an illustrative hot wall slide valve in accordance with one or more example embodiments.

FIG. 3 depicts an example hot wall slide valve. Valve body 300 is surrounded by valve bonnet 310. Valve bonnet cover flange 314 is connected to bonnet 310 via external bolting 312. The disc 328 is positioned downstream of orifice 322. Valve stem 326 moves disc 328 along orifice plate support 318 to open and close orifice 322. A high density refractory lining 320 covers body 300 internal surfaces. Guides (not shown in this figure) may guide the disc as it moves in a linear direction to open and close the orifice.

A slide valve for a fluidized catalytic cracking (FCC), methyl to olefin (MTO), rapid thermal processing (RTP), or other similar processes needs durability against high temperature and powder (catalyst/sand) flow. The slide valve's sliding surfaces may be hard-faced with overlaying. The inner surface may have an abrasion resistant lining. The internal parts may be designed to minimize erosion by catalyst. The valve may be precise-controlled by electro-hydraulic actuators.

Figure 4:
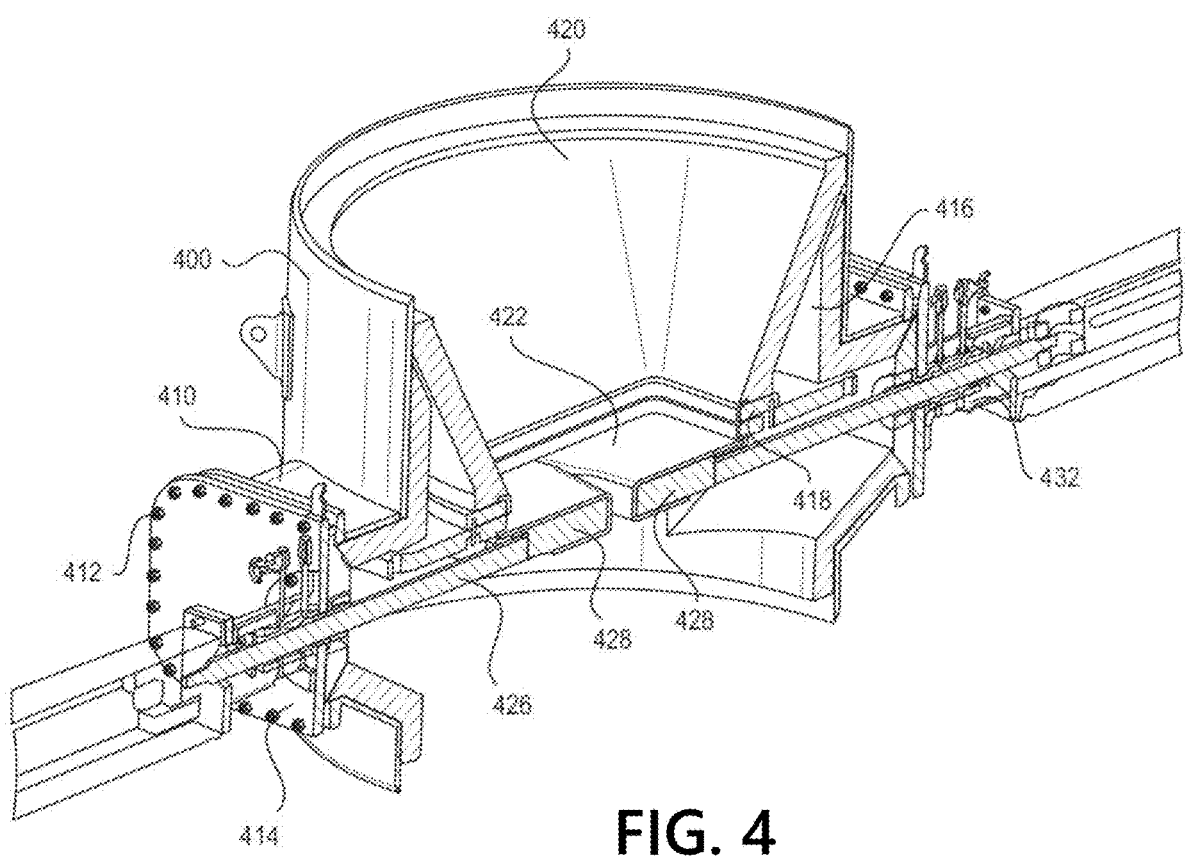
FIG. 4 depicts an illustrative flue gas double disc slide valve in accordance with one or more example embodiments.

FIG. 4 depicts an example flue gas double disc slide valve. Valve body 400 is surrounded by valve bonnet 410. Valve bonnet cover flange 414 is connected to bonnet 410 via external bolting 412. The disc 428 is positioned downstream of orifice 422. Valve stem 426 moves disc 428 along orifice plate support 418 to open and close orifice 422. A high density refractory lining 420 covers body 400 internal surfaces. Guides (not shown) may guide the disc as it moves in a linear direction to open and close the orifice.

Figure 5A:
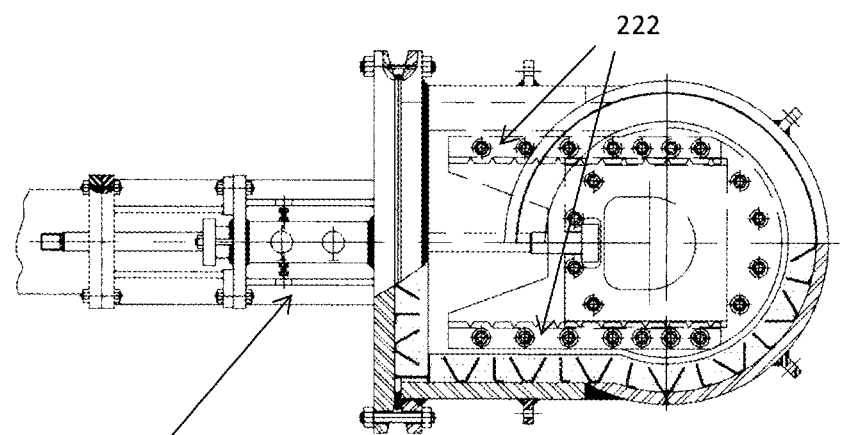
FIGS. 5A and 5B depict a plan view of a cold wall slide valve in accordance with one or more example embodiments.
Figure 5B:
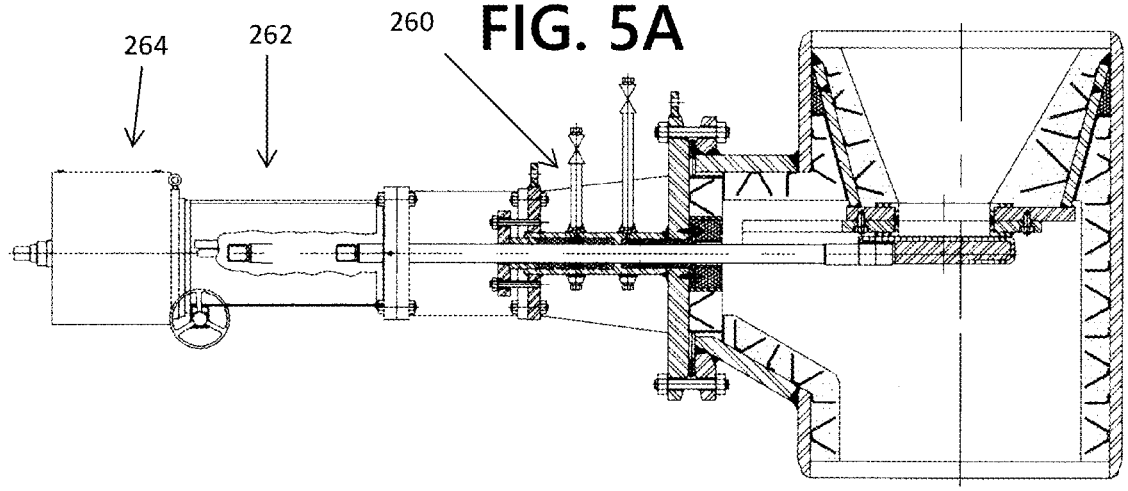

FIGS. 5A and 5B depict plan and elevation views, respectively, of a cold wall slide valve. As shown in FIG. 5A, the cold wall slide valve may include guides 222 that disc 228 will slide between. A stuffing box 260 is utilized for preventing leakage of gases or liquids along a moving rod or shaft at the point at which it leaves a cylinder. The bonnet 262 is connected to actuator 264.

Figure 6A:
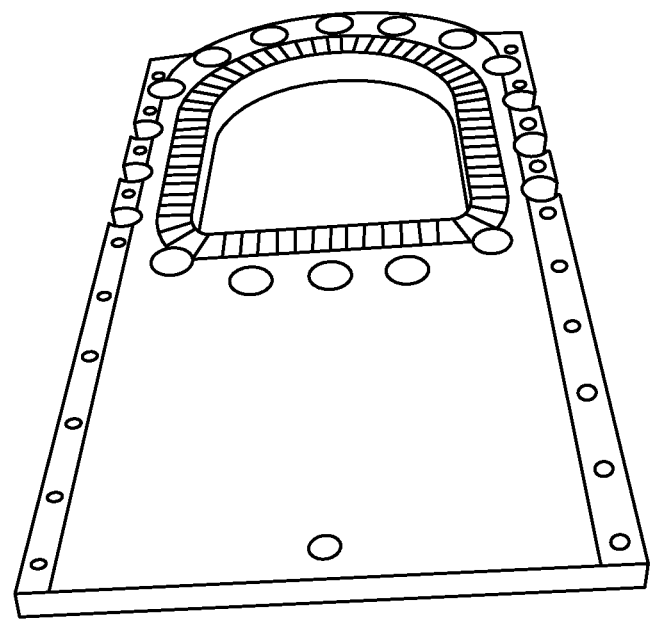
FIG. 6A depicts an orifice plate support having an orifice in accordance with one or more example embodiments.
Figure 6B:
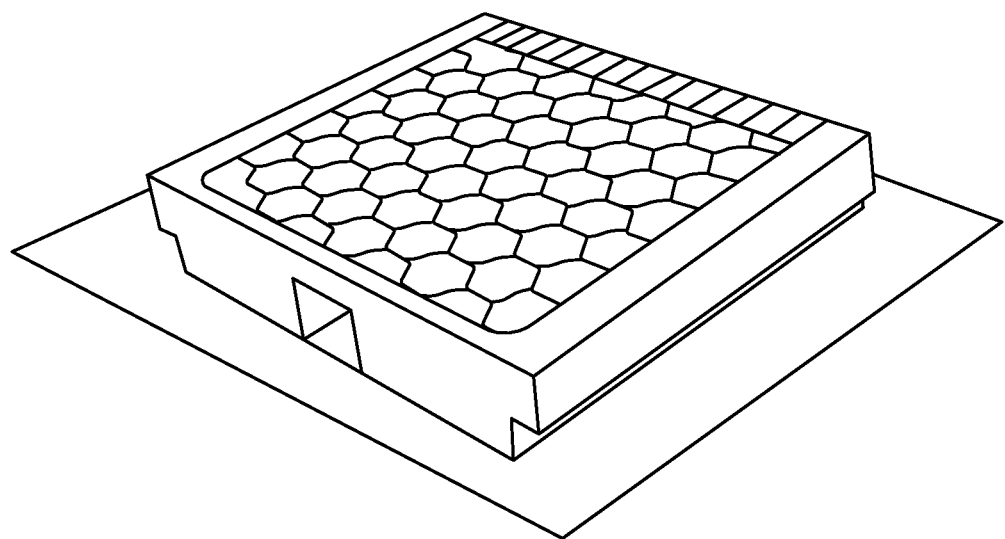
FIG. 6B depicts a disc in accordance with one or more example embodiments.
Figure 7A:
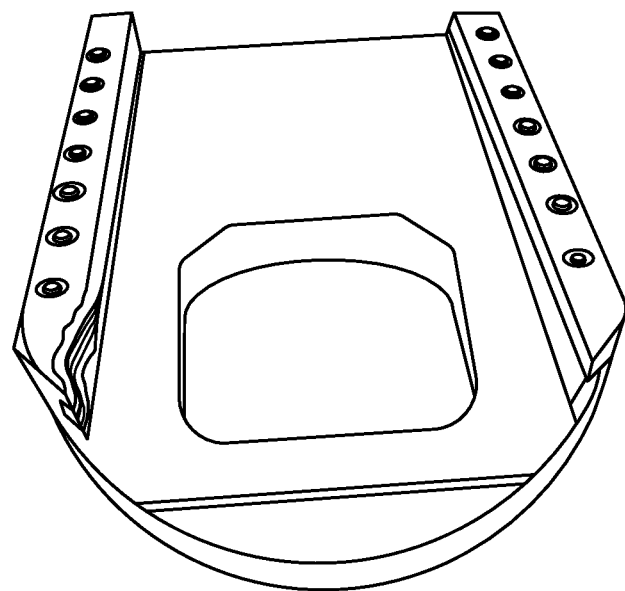
FIG. 7A depicts an illustrative orifice support plate that has experienced erosion.
Figure 7B:
FIG. 7B depicts an illustrative stem that has experienced erosion.

FIG. 6A depicts an orifice plate support having an orifice. FIG. 6B depicts a disc. The top surface of the disc would slide beneath the orifice along the bottom surface of the orifice plate support to open and close the orifice. The body surfaces have a high density refractory lining.

Hydraulic Actuators employ hydraulic pressure to drive an output member and are used where high speed and large forces are required. The fluid used in hydraulic actuator is highly incompressible so that pressure applied can be transmitted instantaneously to the member attached to it. In the slide activator, the hydraulic fluid drives a piston to move the valve disc. Fluid may be supplied by local actuator or by a central oil system for entire system. A hand pump may be present if there is a failure of pressure supply. The system may have redundant components (e.g. solenoids) in case one fails.

Normal design speed for slide valve actuators may be full stroke in 5 seconds using normal hydraulic circuit. Shutdown design speed for slide valve actuators may be full stroke in 2 seconds using shutdown circuit. Dynamic response or speed of response for any step change may be in the range of 2% to 10% of full valve travel. Dead time T(d) the time between when a command is sent and the valve begins to move. Hysteresis is the range that the control signal may be varied before the valve changes direction and relates to the time after an input signal step change until the slide valve system will respond and is, for example, less than 0.3 seconds. Step response after an input signal step change until the output has reached 63% of the final steady state value (T(63)) is, for example, less than 0.4 seconds. Step response time after an input signal step change until the output has reached, for example, 86.5% of the final steady state value (T(86)) is, for example, less than 0.5 seconds.

Figure 9:
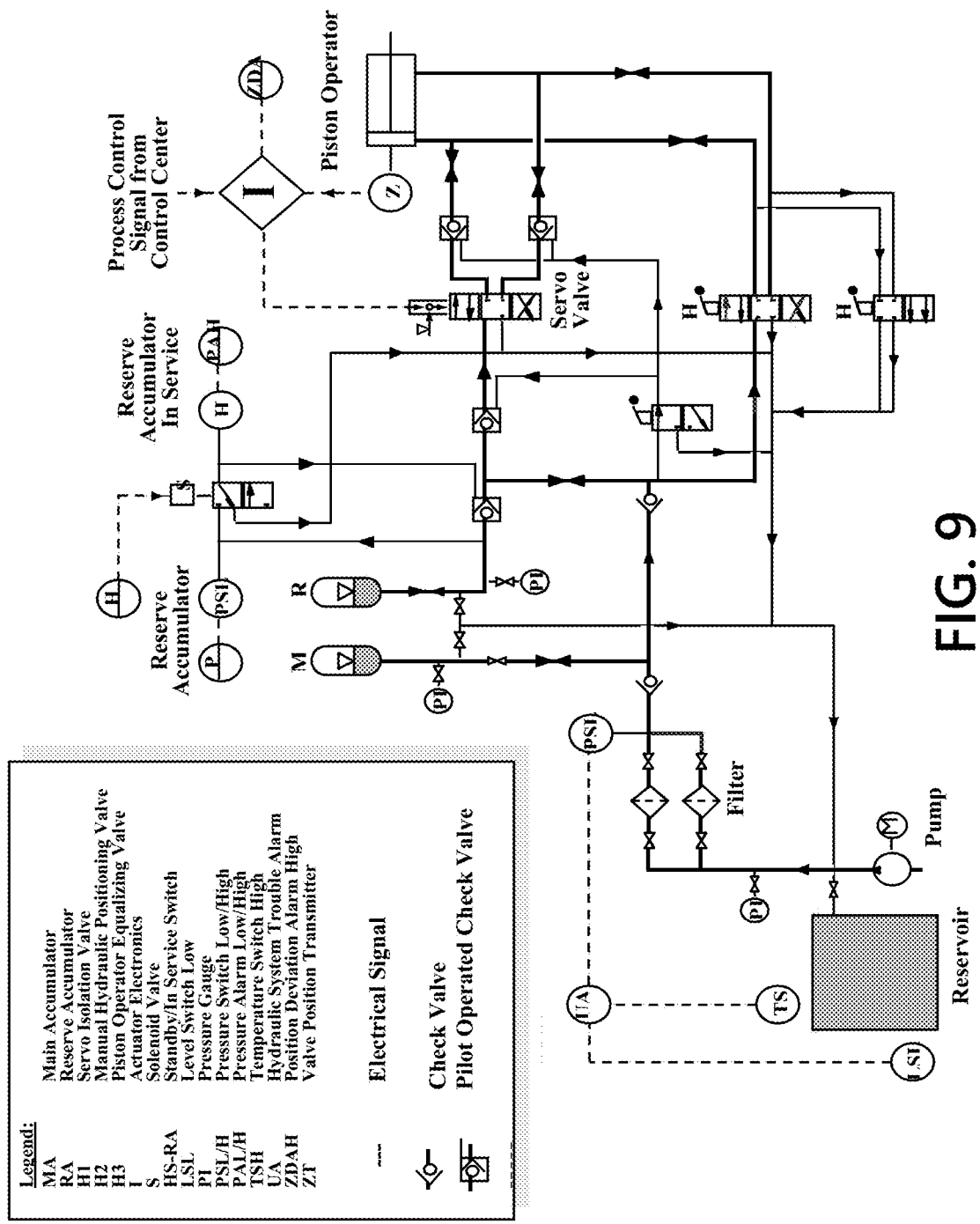
FIG. 9 depicts a slide valve actuator system in accordance with one or more example embodiments.

FIG. 9 depicts an electro-hydraulic slide valve actuator system with an individual power source. A piston operator is directly connected to the slide valve. The electro-hydraulic power unit is a sealed system with its own internal hydraulic reservoir. The hydraulic pump is driven by an electric motor. An accumulator in a hydraulic system provides a means of storing the incompressible fluids under pressure. The main accumulator holds pressure for two full strokes and the reserve accumulator holds pressure for additional two strokes. Two pumps are present and one pump is continuously running. The pumps can drive the valve themselves when accumulators are depleted, but slowly. The piston is moved using the servo valve, which directs hydraulic fluid to one side of the piston or the other. A position transmitter may be provided to provide feedback to compare against the position set point.

Sensor Data Processing

Figure 10A:
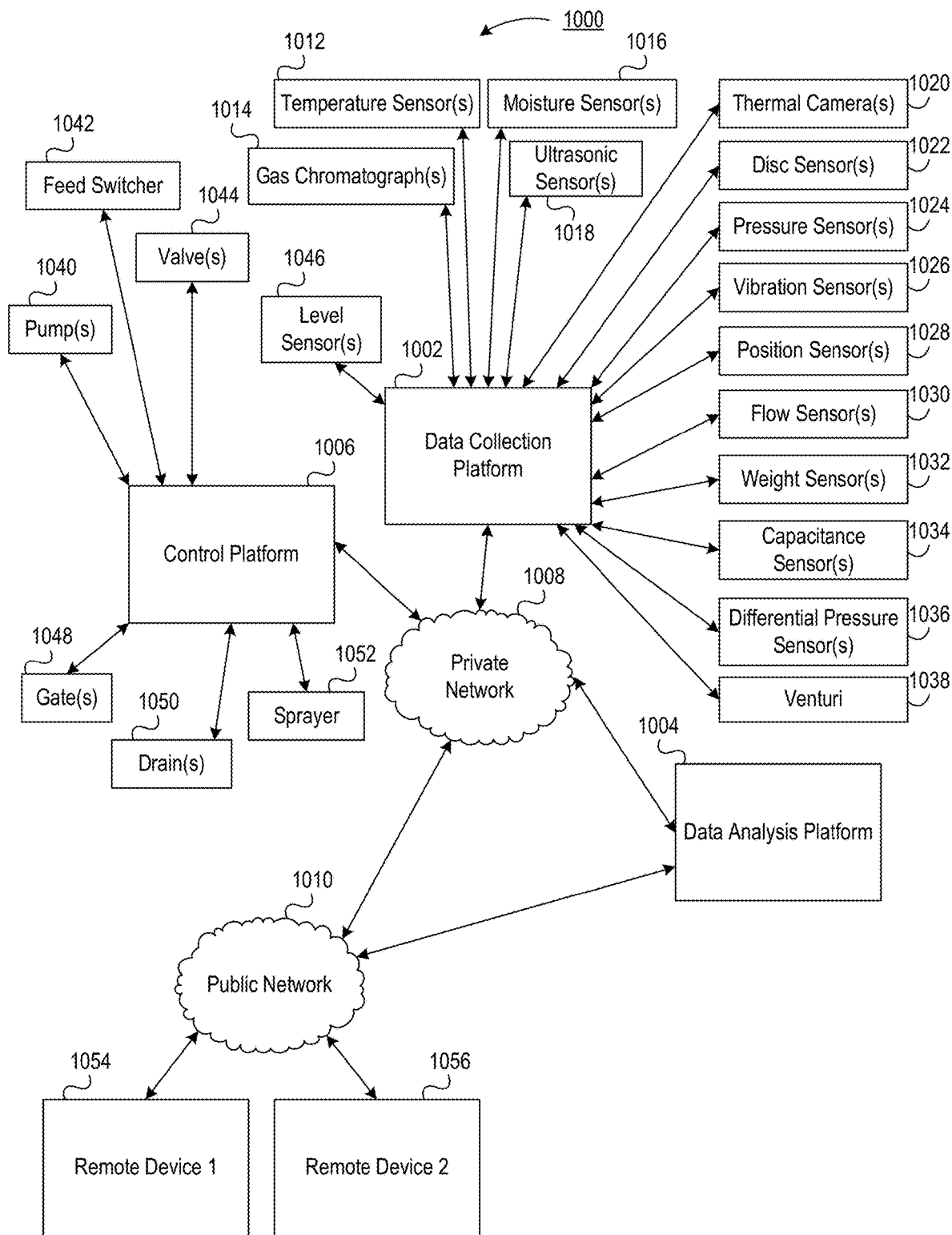
FIG. 10A depicts an illustrative computing environment for managing the operation of one or more pieces of equipment in a plant in accordance with one or more example embodiments.

The system may include one or more computing devices or platforms for collecting, storing, processing, and analyzing data from one or more sensors. FIG. 10A depicts an illustrative computing system that may be implemented at one or more components, pieces of equipment, and/or plants. FIG. 10A-FIG. 10E (hereinafter collectively "FIG. 10"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 10A depicts an illustrative operating environment in which various aspects of the present disclosure may be implemented in accordance with example embodiments. The computing system environment 1000 illustrated in FIG. 10A is only one example of a suitable computing environment and is not intended to suggest any limitation as to the scope of use or functionality contained in the disclosure. The computing system environment 1000 may include various sensor, measurement, and data capture systems, a data collection platform 1002, a data analysis platform 1004, a control platform 1006, one or more networks, one or more remote devices 1054, 1056, and/or one or more other elements. The numerous elements of the computing system environment of FIG. 10A may be communicatively coupled through one or more networks. For example, the numerous platforms, devices, sensors, and/or components of the computing system environment may be communicatively coupled through a private network 1008. The sensors be positioned on various components in the plant and may communicate wirelessly or wired with one or more platforms illustrated in FIG. 10A. The private network 1008 may include, in some examples, a network firewall device to prevent unauthorized access to the data and devices on the private network 1008. Alternatively or additionally, the private network 1008 may be isolated from external access through physical means, such as a hard-wired network with no external, direct access point. The data communicated on the private network 1008 may be optionally encrypted for further security. Depending on the frequency of collection and transmission of sensor measurements and other data to the data collection platform 1002, the private network 1008 may experience large bandwidth usage and be technologically designed and arranged to accommodate for such technological issues. Moreover, the computing system environment 1000 may also include a public network 1010 that may be accessible to remote devices (e.g., remote device 1054, remote device 1056). In some examples, a remote device may be located not in the proximity (e.g., more than one mile away) of the various sensor, measurement, and data capture systems illustrated in FIG. 10A. In other examples, the remote device may be physically located inside a plant, but restricted from access to the private network 1008; in other words, the adjective "remote," need not necessarily require the device to be located at a great distance from the sensor systems and other components.

Although the computing system environment of FIG. 10A illustrates logical block diagrams of numerous platforms and devices, the disclosure is not so limited. In particular, one or more of the logical boxes in FIG. 10 may be combined into a single logical box or the functionality performed by a single logical box may be divided across multiple existing or new logical boxes. For example, aspects of the functionality performed by the data collection platform 1002 may be incorporated into one or each of the sensor devices illustrated in FIG. 10A. As such, the data collection may occur local to the sensor device, and the enhanced sensor system may communicate directly with one or more of the control platform 1006 and/or data analysis platform 1004. Such an embodiment is contemplated by FIG. 10A. Moreover, in such an embodiment, the enhanced sensor system may measure values common to a sensor, but may also filter the measurements such just those values that are statistically relevant or of-interest to the computing system environment are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 10A may be combined into an enhanced, multi-purpose sensor system. Such a combined sensor system may provide economies of scale with respect to hardware components such as processors, memories, communication interfaces, and others.

In yet another example, the data collection platform 1002 and data analysis platform 1004 may reside on a single server computer and depicted as a single, combined logical box on a system diagram. Moreover, a data store may be illustrated in FIG. 10A separate and apart from the data collection platform 1002 and data analysis platform 1004 to store a large amount of values collected from sensors and other components. The data store may be embodied in a database format and may be made accessible to the public network 1010; meanwhile, the control platform 1006, data collection platform 1002, and data analysis platform 1004 may be restricted to the private network 1008 and left inaccessible to the public network 1010. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over the public network 1010.

Referring to FIG. 10A, process measurements from various sensor and monitoring devices may be used to monitor conditions in, around, and on process equipment. Such sensors may include, but are not limited to, pressure sensors 1024, differential pressure sensors 1036, disc sensors 1022, venturi 1038, other flow sensors 1030, temperature sensors 1012 including thermal cameras 1020 and skin thermocouples, capacitance sensors 1034, weight sensors 1032, gas chromatographs 1014, moisture sensors 1016, ultrasonic sensors 1018, position sensors 1028, timing sensors, vibration sensors 1026, microphones, level sensors 1046, liquid level (hydraulic fluid) sensors, and other sensors used in the refining and petrochemical industry. Further, process laboratory measurements may be taken using gas chromatographs 1014, liquid chromatographs, distillation measurements, octane measurements, and other laboratory measurements.

In addition, sensors may include transmitters and/or deviation alarms. These sensors may be programmed to set off an alarm. For example, if an actuator fails, a sensor may automatically trigger an alarm. Other sensors may transmit signals to a processor or a hub that collects the data and sends to a processor. For example, temperature and pressure measurements may be sent to a hub (e.g., data collection platform 1002). In one example, temperature sensors 1012 may include thermocouples, fiber optic temperature measurement, thermal cameras 1020, and/or infrared cameras. Skin thermocouples may be placed directly on a wall of a slide valve component such as the valve body, the discs, and the stem. Alternatively or additionally, skin thermocouples may be applied to tubes or plates and thermal (infrared) cameras 1020 may be used to detect hot spots in all aspects of the equipment including bundles (tubes). A shielded (insulated) tube skin thermocouple assembly may be used to obtain accurate measurements. One example of a thermocouple may be a removable Xtracto™ Pad. A thermocouple can be replaced without any additional welding. Clips and/or pads may be utilized for ease of replacement. One or more thermal or infrared cameras may be placed on or around a slide valve.

In another example, a position sensor may detect a valve position magnetically or using a mechanical-limit switch. A position sensor may determine proximity. A position sensor may determine when a component of the system moves between a first position and a second position (e.g., when the disc moves from an open to a closed position, or when the piston moves from an extended to a retracted position). For example, a positional sensor can sense whether the disc is opening and closing completely.

Figure 8:
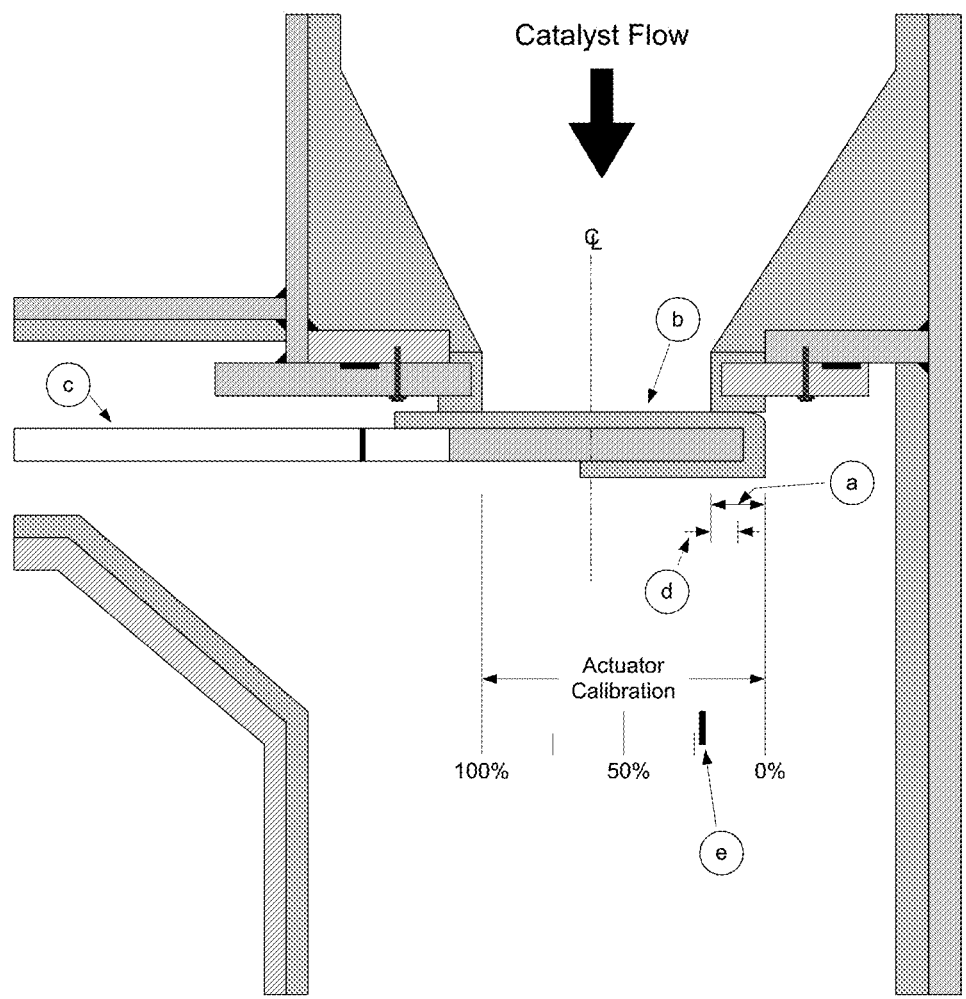
FIG. 8 depicts calibration for a slide valve actuator in accordance with one or more example embodiments.

FIG. 8 depicts an illustrative calibration for a slide valve actuator. A position sensor may determine a position of the slide valve actuator. The position sensor may measure 0% when the slide valve is in the fully closed position (valve orifice covered). The position sensor may measure 100% when the slide valve is in the fully open position (valve orifice uncovered). System operational measurements also can be taken to correlate the system operation to the slide valve measurements.

Alternatively or additionally, pressure sensors, level sensors, and temperature sensors may be used to take various data measurements of one or more parts of a slide valve actuator. Pressure sensors may be used to verify solenoid operation. Pressure sensors may be placed on the piston and accumulators. Temperature and level sensors may be placed on or in the hydraulic reservoir and accumulators. Pressure sensors may be placed on or in discs, e.g., one for each side of piston. Measurements from piston pressure sensors may be used to calculate output thrust value. A low pressure setpoint may be calculated, which may, for example, be equivalent to the minimum pressure required to stroke the piston from full open to full closed one time, based on maximum travel. Timing sensors may be placed on or near the pistons, stems, and/or discs to measure the time it takes to open and close the disc over the orifice. Liquid level sensors may be placed to determine hydraulic fluid levels for hydraulic pistons.

In another example, strain sensors may test the strain on a part. Strain gauges may be applied on or in metal surfaces to measure strain, for example in the disc or stem. A strain gauge may be more sensitive in a particular direction (e.g., a strain gauge may be more sensitive in a horizontal direction than a vertical direction, or may be more sensitive in a vertical direction than a horizontal direction). A strain gauge may include an electrical conductor (e.g., foil, semiconductor, nanoparticle) that, when subjected to a strain (e.g., compression or stretching) in a particular direction, may increase or decrease in electrical conductivity. The gauge's resistance will experience a corresponding change (increased or decreased electrical conductivity), which allows for an amount of induced stress on the strain gauge to be determined when a voltage is applied to the gauge.

Sensor Data Collection

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals, such as corrosive species, oxygen, hydrogen, and/or water (moisture). In another example, equipment information, such as wear, efficiency, production, state, or other condition information, may be gathered and determined based on sensor data. Corrective action may be taken based on determining this equipment information. For example, if the equipment is showing signs of wear or failure, corrective actions may be taken, such as taking an inventory of parts to ensure replacement parts are available, ordering replacement parts, and/or calling in repair personnel to the site. Certain parts of equipment may be replaced immediately. Other parts may be safe to use, but a monitoring schedule may be adjusted. Alternatively or additionally, one or more inputs or controls relating to a process may be adjusted as part of the corrective action. These and other details about the equipment, sensors, processing of sensor data, and actions taken based on sensor data are described in further detail below.

Monitoring the slide valves and the processes using slide valves includes collecting data that can be correlated and used to predict behavior or problems in different slide valves used in the same plant or in other plants and/or processes. Process changes or operating conditions may be able to be altered to preserve the equipment until the next scheduled maintenance period.

Systems Facilitating Sensor Data Collection

Sensor data may be collected by a data collection platform 1002. The sensors may interface with the data collection platform 1002 via wired or wireless transmissions. The data collection platform 1002 may continuously or periodically (e.g., every second, every minute, every hour, every day, once a week, once a month, etc.) transmit collected sensor data to a data analysis platform 1004, which may be nearby or remote from the data collection platform 1002.

Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different spots at different intervals. For example, data at a known hot spot may be collected at a first interval, and data at a spot that is not a known hot spot may be collected at a second interval.

Figure 10B:
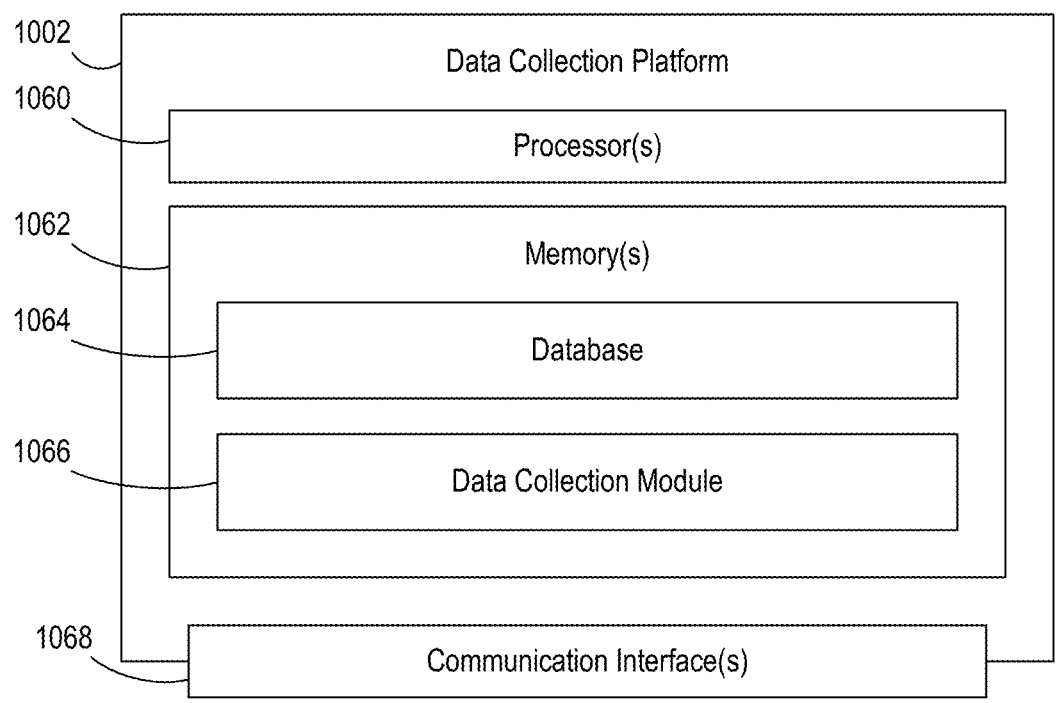
FIG. 10B depicts an illustrative data collection computing platform for collecting data related to the operation of one or more pieces of equipment in a plant in accordance with one or more example embodiments.
Figure 10C:
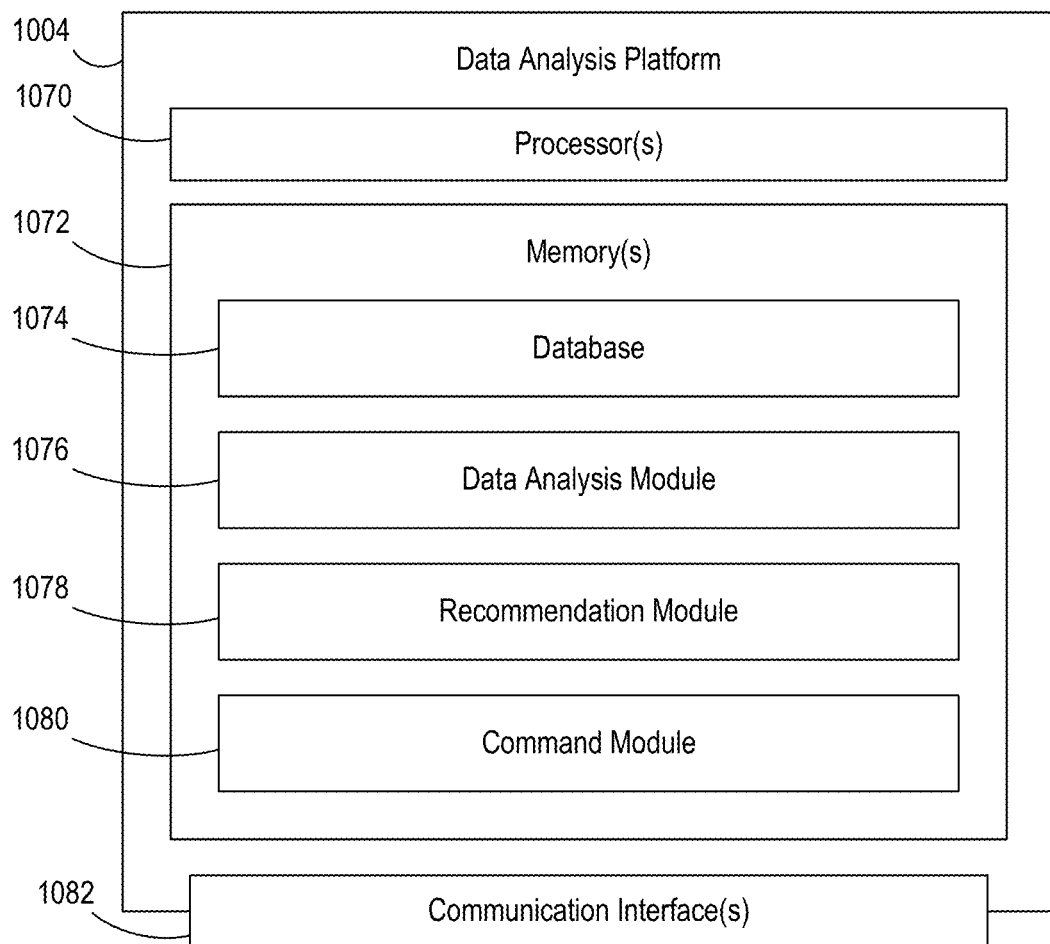
FIG. 10C depicts an illustrative data analysis computing platform for analyzing data related to the operation of one or more pieces of equipment in a plant in accordance with one or more example embodiments.
Figure 10D:
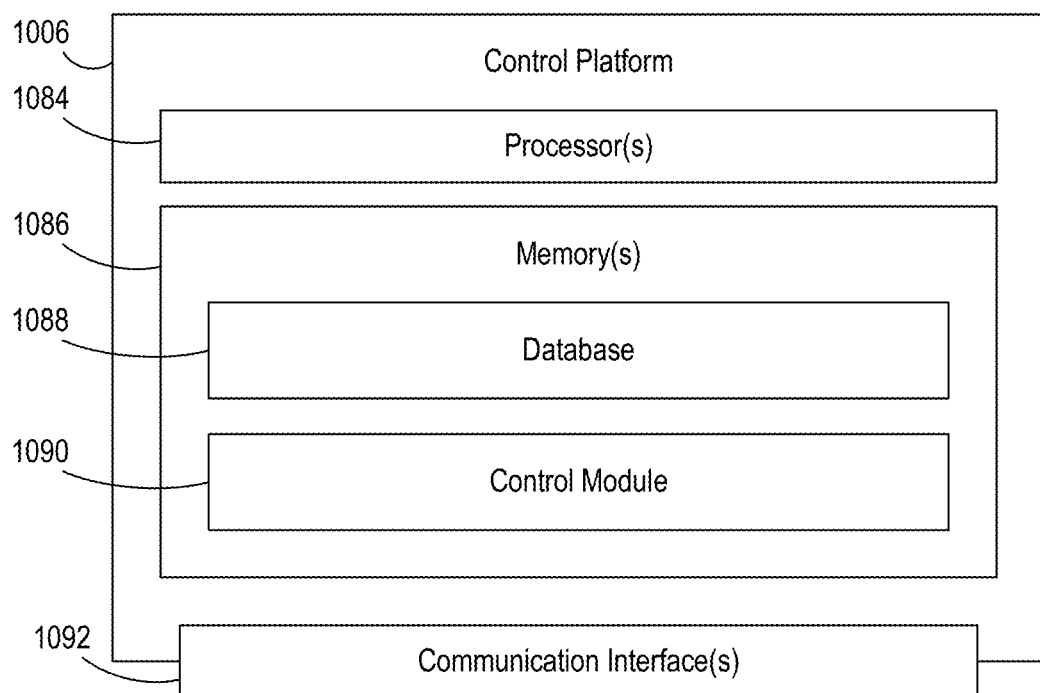
FIG. 10D depicts an illustrative data analysis computing platform for analyzing data related to the operation of one or more pieces of equipment in a plant in accordance with one or more example embodiments.
Figure 10E:
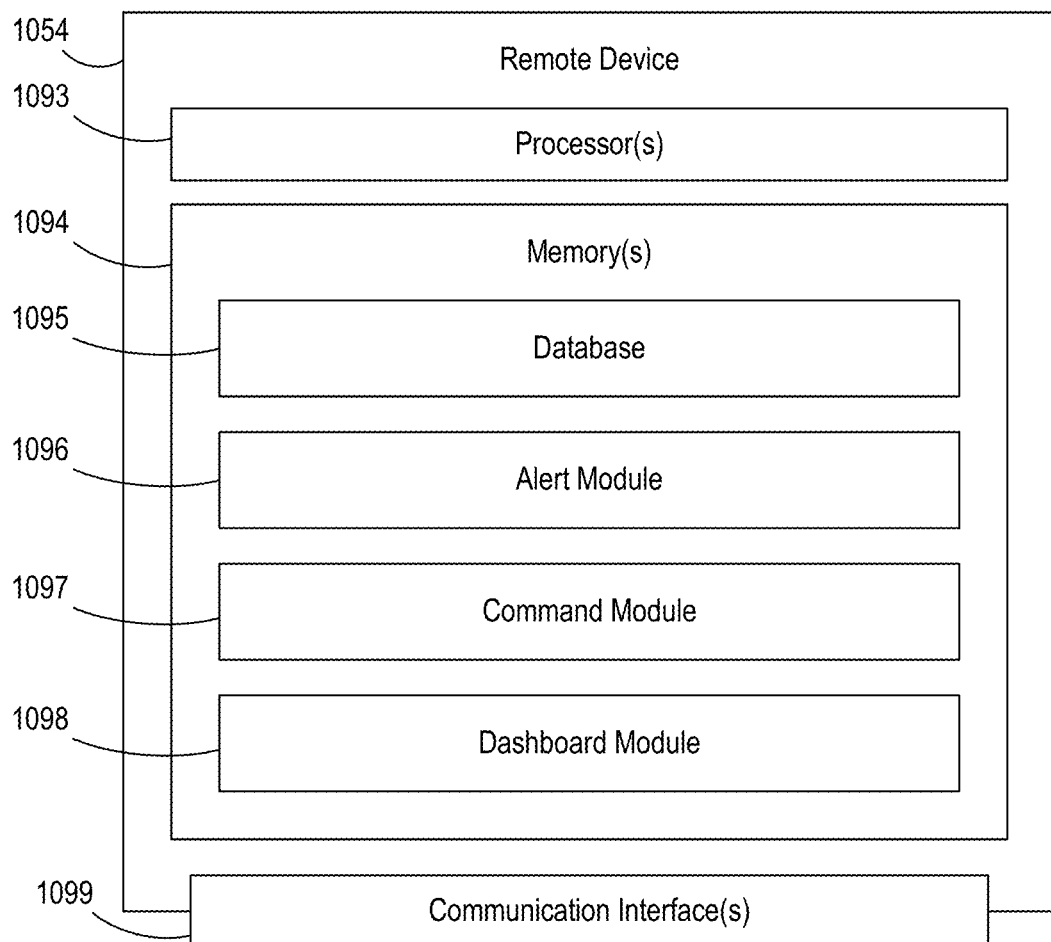
FIG. 10E depicts an illustrative control computing platform for controlling one or more parts of one or more pieces of equipment in a plant in accordance with one or more example embodiments.

The computing system environment of FIG. 10A includes logical block diagrams of numerous platforms and devices that are further elaborated upon in FIG. 10B, FIG. 10C, FIG. 10D, and FIG. 10E. FIG. 10B is an illustrative data collection platform 1002. FIG. 10C is an illustrative data analysis platform 1004. FIG. 10D is an illustrative control platform 1006. FIG. 10E is an illustrative remote device 1054. These platforms and devices of FIG. 10 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

In addition, the platform and/or devices in FIG. 10 may include one or more memories include any of a variety of computer readable media. Computer readable media may be any available media that may be accessed by the data collection platform 1002, may be non-transitory, and may include volatile and nonvolatile, removable and non-removable media implemented in any method or technology for storage of information such as computer-readable instructions, object code, data structures, database records, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform 1002. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 10 may include one or more communication interfaces including, but are not limited to, a microphone, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network 1010 or private network 1008 with one or more other components on the network. The network controller may include electronic hardware for communicating over network protocols, including TCP/IP, UDP, Ethernet, and other protocols.

In some examples, one or more sensor devices in FIG. 10A may be enhanced by incorporating functionality that may otherwise be found in a data collection platform 1002. These enhanced sensor system may provide further filtering of the measurements and readings collected from their sensor devices. For example, with some of the enhanced sensor systems in the operating environment illustrated in FIG. 10A, an increased amount of processing may occur at the sensor so as to reduce the amount of data needing to be transferred over a private network 1008 in real-time to a computing platform. The enhanced sensor system may filter at the sensor itself the measured/collected/captured data and only particular, filtered data may be transmitted to the data collection platform 1002 for storage and/or analysis.

Referring to FIG. 10B, in one example, a data collection platform 1002 may include one or more processors 1060, one or more memories 1062, and communication interfaces 1068. The memory 1062 may include a database 1064 for storing data records of various values collected from one or more sources. In addition, a data collection module 1066 may be stored in the memory 1062 and assist the processor 1060 in the data collection platform 1002 in communicating with, via the communications interface 1068, one or more sensor, measurement, and data capture systems, and processing the data received from these sources. In some embodiments, the data collection module 1066 may include computer-executable instructions that, when executed by the processor 1060, cause the data collection platform 1002 to perform one or more of the steps disclosed herein. In other embodiments, the data collection module 1066 may be a hybrid of software-based and/or hardware-based instructions to perform one or more of the steps disclosed herein. In some examples, the data collection module 1066 may assist an enhanced sensor system with further filtering the measurements and readings collected from the sensor devices. Although the elements of FIG. 10B are illustrated as logical block diagrams, the disclosure is not so limited. In particular, one or more of the logical boxes in FIG. 10B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 1064 in FIG. 10B is illustrated as being stored inside one or more memories 1062 in the data collection platform 1002, FIG. 10B contemplates that the database 1064 may be stored in a standalone data store communicatively coupled to the data collection module 1066 and processor 1060 of the data collection platform 1002 via the communications interface 1068 of the data collection platform 1002.

In addition, the data collection module 1066 may assist the processor 1060 in the data collection platform 1002 in communicating with, via the communications interface 1068, and processing data received from other sources, such as data feeds from third-party servers and manual entry at the field site from a dashboard graphical user interface. For example, a third-party server may provide contemporaneous weather data to the data collection module. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas will have different stresses than a chemical plant in Montana. In another example, data manually entered from a dashboard graphical user interface (or other means) may be collected and saved into memory by the data collection module. Production rates may be entered and saved in memory. Tracking production rates may indicate issues with flows. For example, as fouling occurs, the production rate may fall if a specific outlet temperature can no longer be achieved at the targeted capacity and capacity has to be reduced to maintain the targeted outlet temperature.

Referring to FIG. 10C, in one example, a data analysis platform 1004 may include one or more processors 1070, one or more memories 1072, and communication interfaces 1082. The memory 1072 may include a database 1074 for storing data records of various values collected from one or more sources. Alternatively or additionally, the database

1074 may be the same database as that depicted in FIG. 10B and the data analysis platform 1004 may communicatively couple with the database 1074 via the communication interface of the data analysis platform 1004. At least one advantage of sharing a database between the two platforms is the reduced memory requirements due to not duplicating of the same or similar data. In addition, a data analysis module 1076 may be stored in the memory 1072 and assist the processor 1070 in the data analysis platform 1004 in processing and analyzing the data values stored in the database 1074. In some embodiments, the data analysis module 1076 may include computer-executable instructions that, when executed by the processor 1070, cause the data analysis platform 1004 to perform one or more of the steps disclosed herein. In other embodiments, the data analysis module 1076 may be a hybrid of software-based and/or hardware-based instructions to perform one or more of the steps disclosed herein. In some embodiments, the data analysis module 1076 may perform statistical analysis, predictive analytics, and/or machine learning on the data values in the database 1074 to generate predictions and models. For example, the data analysis platform 1004 may analyze sensor data to detect new hot spots and/or to monitor existing hot spots (e.g., to determine if an existing hot spot is growing, maintaining the same size, or shrinking) in the equipment of a plant. The data analysis platform 1004 may compare temperature data from different dates to determine if changes are occurring. Such comparisons may be made on a monthly, weekly, daily, hourly, real-time, or some other basis.

Referring to FIG. 10C, the recommendation module 1078 in the data analysis platform 1004 may coordinate with the data analysis module 1076 to generate recommendations for adjusting one or more parameters for the operation of the plant environment depicted in FIG. 10A. In some embodiments, the recommendation module 1078 may communicate the recommendation to the command module 1080, which may generate command codes that may be transmitted, via the communications interface, to cause adjustments or halting/starting of one or more operations in the plant environment. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute on them.

Although the elements of FIG. 10C are illustrated as logical block diagrams, the disclosure is not so limited. In particular, one or more of the logical boxes in FIG. 10C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 10C as being stored inside one or more memories in the data analysis platform 1004, FIG. 10C contemplates that the database may be stored in a standalone data store communicatively coupled to the data analysis module and processor of the data analysis platform 1004 via the communications interface of the data analysis platform 1004. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 10D, in one example, a control platform 1006 may include one or more processors 1084, one or more memories 1086, and communication interfaces 1092. The memory 1086 may include a database 1088 for storing data records of various values transmitted from a user interface, computing device, or other platform. The values may include parameter values for particular equipment at the plant. For example, some illustrative equipment at the plant that may be configured and/or controlled by the control platform 1006 include, but is not limited to, a feed switcher, sprayer, one or more valves, one or more pumps, one or more gates, and/or one or more drains. In addition, a control module 1090 may be stored in the memory and assist the processor in the control platform 1006 in receiving, storing, and transmitting the data values stored in the database. In some embodiments, the control module 1090 may include computer-executable instructions that, when executed by the processor 1084, cause the control platform 1006 to perform one or more of the steps disclosed herein. In other embodiments, the control module may be a hybrid of software-based and/or hardware-based instructions to perform one or more of the steps disclosed herein.

In a plant environment such as illustrated in FIG. 10A, if sensor data is outside of a safe range, this may be cause for immediate danger. As such, there is a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated by the alert module in FIG. 10E.

Referring to FIG. 10E, in one example, a remote device 1054 may include one or more processors 1093, one or more memories 1094, and communication interfaces 1099. The memory 1094 may include a database 1095 for storing data records of various values entered by a user or received through the communications interface. In addition, an alert module 1096, command module 1097, and/or dashboard module 1098 may be stored in the memory 1094 and assist the processor 1093 in the remote device 1054 in processing and analyzing the data values stored in the database. In some embodiments, the aforementioned modules may include computer-executable instructions that, when executed by the processor, cause the remote device 1054 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a dangerous condition or even merely a warning condition due to odd sensor readings. The command module 1097 in the remote device 1054 may generate a command that when transmitted through the communications interface to the platforms at the plant, causes adjusting of one or more parameter operations of the plant environment depicted in FIG. 10A. In some embodiments, the dashboard module 1098 may display a graphical user interface to a user of the remote device 1054 to enable the user to enter desired parameters and/or commands. These parameters/commands may be transmitted to the command module 1097 to generate the appropriate resulting command codes that may be then transmitted, via the communications interface, to cause adjustments or halting/starting of one or more operations in the plant environment. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute on them.

Although FIG. 10E is not so limited, in some embodiments the remote device 1054 may include a desktop computer, a smartphone, a wireless device, a tablet computer, a laptop computer, and/or the like. The remote device 1054 may be physically located locally or remotely, and may be connected by one of communications links to the public network 1010 that is linked via a communications link to the private network 1008. The network used to connect the remote device 1054 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network 1008 (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 10E are illustrated as logical block diagrams, the disclosure is not so limited. In particular, one or more of the logical boxes in FIG. 10E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 10E as being stored inside one or more memories in the remote device 1054, FIG. 10E contemplates that the database may be stored in a standalone data store communicatively coupled, via the communications interface, to the modules stored at the remote device 1054 and processor of the remote device 1054.

Referring to FIG. 10, in some examples, the performance of operation in a plant may be improved by using a cloud computing infrastructure and associated methods, as described in US Patent Application Publication No. US2016/0260041, which was published Sep. 8, 2016, and which is herein incorporated by reference in its entirety. The methods may include, in some examples, obtaining plant operation information from the plant and/or generating a plant process model using the plant operation information.

The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies, which may be acted upon to optimize impact.

The aforementioned cloud computing infrastructure may use a data collection platform 1002 associated with a plant to capture data, e.g., sensor measurements, which may be automatically sent to the cloud infrastructure, which may be remotely located, where it may be reviewed to, for example, eliminate errors and biases, and used to calculate and report performance results. The data collection platform 1002 may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant is/are compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform 1004 may include an analysis unit that determines operating status, based on at least one of a kinetic model, a parametric model, an analytical tool, and a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally in yet another example, one or more of the aforementioned examples may be performed with or without a combination of the other examples.

The plant process model predicts plant performance that is expected based upon the plant operation information. The plant process model results can be used to monitor the health of the plant and to determine whether any upset or poor measurement occurred. The plant process model is desirably generated by an iterative process that models at various plant constraints to determine the desired plant process model.

Using a web-based system for implementing the method of this disclosure provides many benefits, such as improved plant economic performance due to an increased ability by plant operators to identify and capture economic opportunities, a sustained ability to bridge plant performance gaps, and an increased ability to leverage personnel expertise and improve training and development. Some of the methods disclosed herein allow for automated daily evaluation of process performance, thereby increasing the frequency of performance review with less time and effort required from plant operations staff.

Further, the analytics unit may be partially or fully automated. In one embodiment, the system is performed by a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Figure 11A:
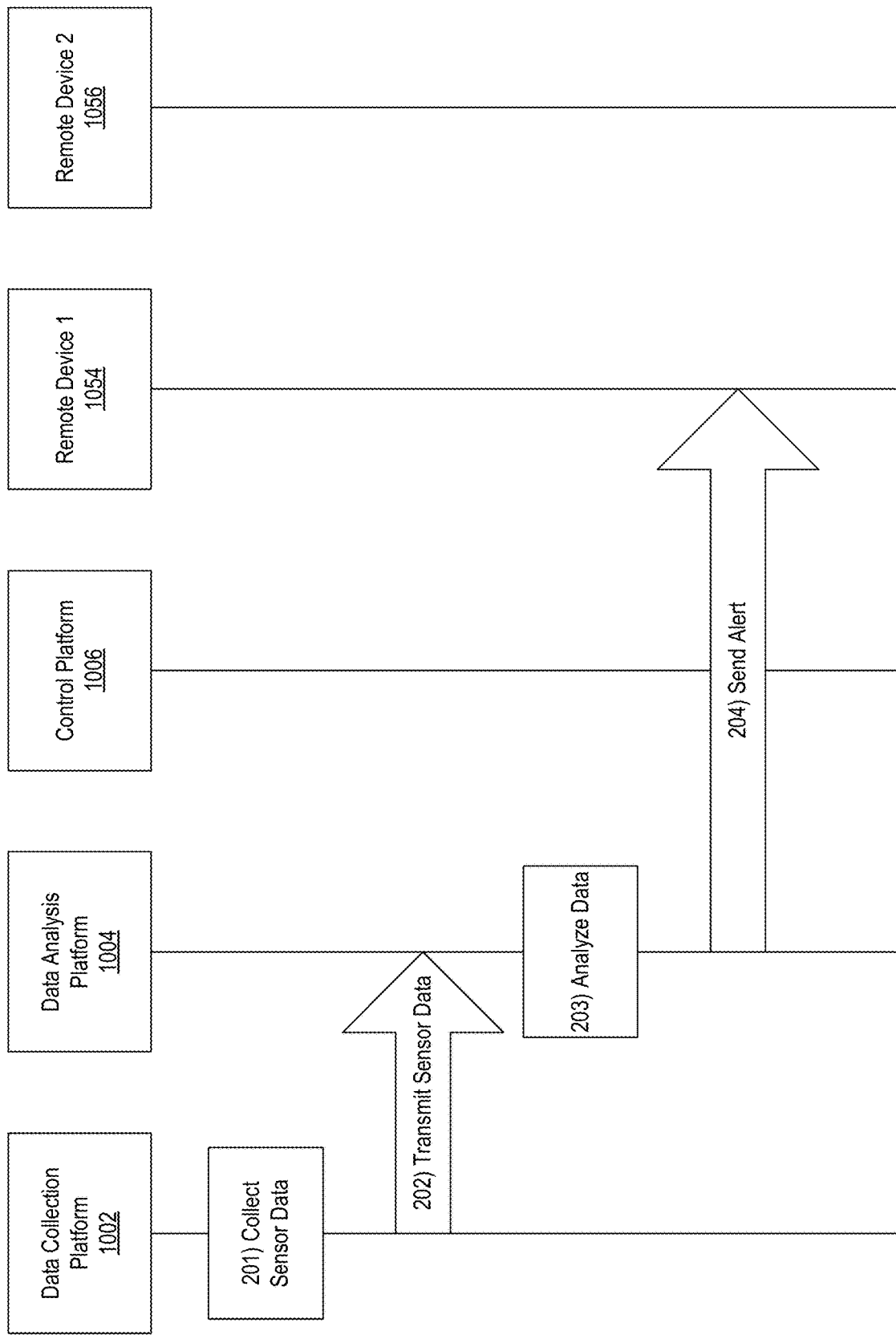

FIGS. 11A-11B depict illustrative system flow diagrams in accordance with one or more embodiments described herein. As shown in FIG. 11A, in step 201, data collection platform 1002 may collect sensor data. In step 202, data collection platform 1002 may transmit sensor data to data analysis platform 1004. In step 203, data analysis platform 1004 may analyze data. In step 204, data analysis platform 1004 may send an alert to remote device 1054 and/or remote device 1056.

As shown in FIG. 11B, in step 205, data analysis platform 1004 may receive a command from remote device 1054 and/or remote device 1056. In some embodiments, the control platform 1006 may receive the command from remote device 1054 and/or remote device 1056. In step 206, data analysis platform 1004 may send a command to control platform 1006. In some embodiments, the command may be similar to the command received from remote device 1054 and/or remote device 1056. In some embodiments, data analysis platform 1004 may perform additional analysis based on the received command from remote device 1054 and/or remote device 1056 before sending a command to control platform 1006. In step 207, control platform 1006 may take corrective action. The corrective action may be based on the command received from data analysis platform 1004, remote device 1054, and/or remote device 1056. The corrective action may be related to one or more pieces of equipment (e.g., slide valve) associated with sensors that collected the sensor data in step 201.

Figure 14:
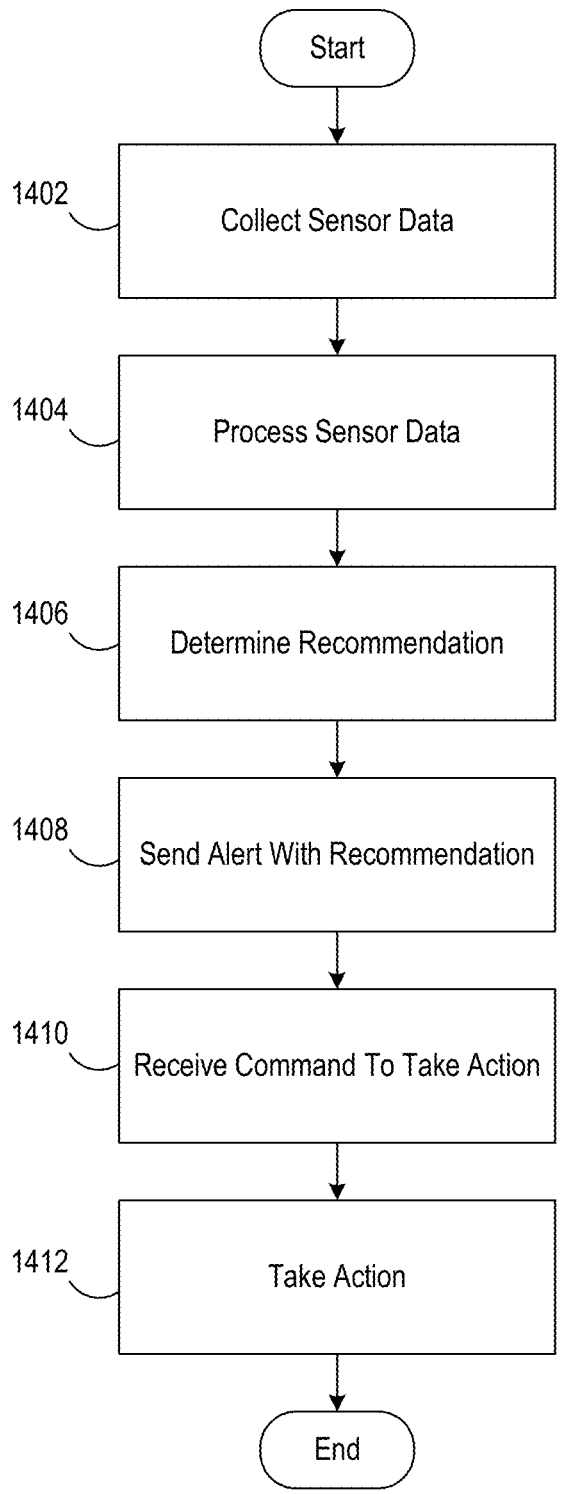
FIG. 14 depicts an illustrative flowchart of a process that one or more devices may perform in controlling one or more aspects of a plant operation in accordance with one or more example embodiments.

FIG. 14 depicts an illustrative flow diagram in accordance with one or more embodiments described herein. The flow may be performed by one or more devices, which may be interconnected via one or more networks.

First, the one or more devices may collect 1402 sensor data. The sensor data may be from one or more sensors attached to one or more pieces of equipment (e.g., a slide valve) in a plant. The sensor data may be locally collected and processed and/or may be locally collected and transmitted for processing.

After the sensor data is collected, the one or more devices may process 1404 the sensor data. The one or more devices may compare the data to past data from the one or more pieces of equipment, other pieces of equipment at a same plant, one or more pieces of equipment at a different plant, manufacturer recommendations or specifications, or the like.

After the sensor data is processed, the one or more devices may determine 1406 one or more recommendations based on the sensor data. The one or more recommendations may include recommendations of one or more actions to take based on the sensor data.

The one or more devices may send 1408 one or more alerts, which may include the determined recommendation. The one or more alerts may include information about the sensor data, about other data, or the like.

The one or more devices may receive 1410 a command to take an action (e.g., the recommended action, an action other than the recommended action, or no action). After receiving the command, the one or more devices may take 1412 the action. The action may, in some embodiments, include one or more corrective actions, which may cause one or more changes in the operation of the one or more pieces of equipment.

Figure 12:
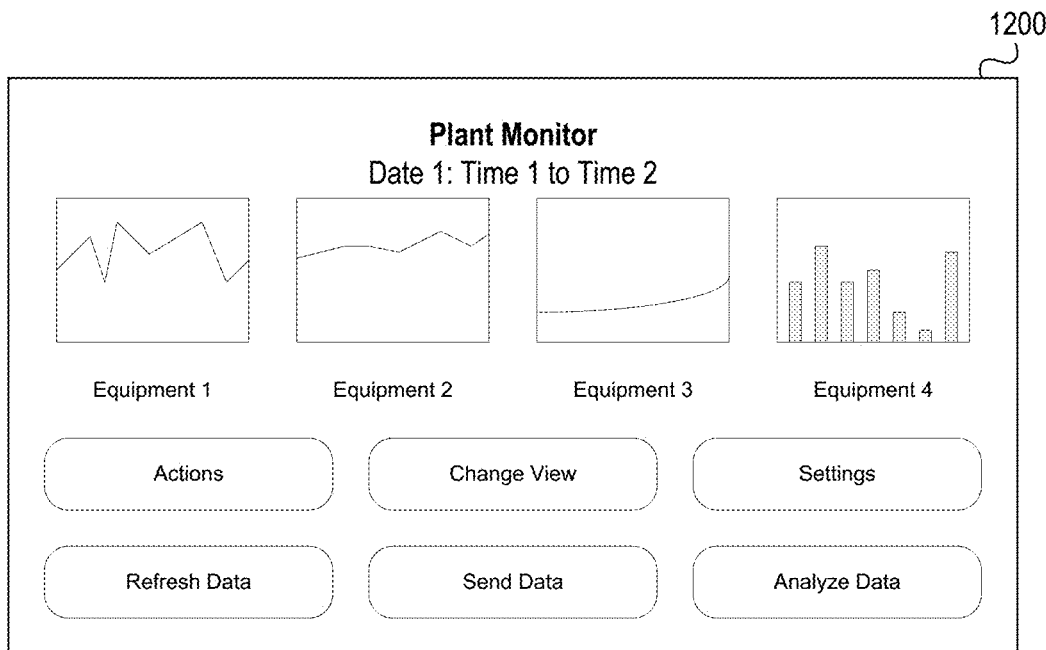
FIGS. 12-13 depict illustrative graphical user interfaces related to one or more aspects of a plant operation in accordance with one or more example embodiments.

FIG. 12 depicts an illustrative graphical user interface 1200 of an application that may be used for providing information received from one or more sensors or determined based on analyzing information received from one or more sensors, according to one or more embodiments described herein. The graphical user interface may be displayed as part of a smartphone application (e.g., running on a remote device, such as remote device 1 or remote device 2), a desktop application, a web application (e.g., that runs in a web browser), a web site, an application running on a plant computer, or the like.

The graphical user interface 1200 may include one or more visual representations of data (e.g., chart, graph, etc.) that shows information about a plant, a particular piece of equipment in a plant, or a process performed by a plant or a particular piece or combination of equipment in the plant. For example, a graph may show information about an operating condition, an efficiency, a production level, or the like. The graphical user interface 1200 may include a description of the equipment, the combination of equipment, or the plant to which the visual display of information pertains.

The graphical user interface 1200 may display the information for a particular time or period of time (e.g., the last five minutes, the last ten minutes, the last hour, the last two hours, the last 12 hours, the last 24 hours, etc.). The graphical user interface may be adjustable to show different ranges of time, automatically or based on user input.

The graphical user interface 1200 may include one or more buttons that allow a user to take one or more actions. For example, the graphical user interface may include a button (e.g., an "Actions" button) that, when pressed, shows one or more actions available to the user. The graphical user interface may include a button (e.g., a "Change View" button) that, when pressed, changes one or more views of one or more elements of the graphical user interface. The graphical user interface may include a button (e.g., a "Settings" button) that, when pressed, shows one or more settings of the application of which the graphical user interface is a part. The graphical user interface may include a button (e.g., a "Refresh Data" button) that, when pressed, refreshes data displayed by the graphical user interface. In some aspects, data displayed by the graphical user interface may be refreshed in real time, according to a preset schedule (e.g., every five seconds, every ten seconds, every minute, etc.), and/or in response to a refresh request received from a user. The graphical user interface may include a button (e.g., a "Send Data" button) that, when pressed, allows a user to send data to one or more other devices. For example, the user may be able to send data via email, SMS, text message, iMessage, FTP, cloud sharing, Airdrop, or via some other method. The user may be able to select one or more pieces of data, graphics, charts, graphs, elements of the display, or the like to share or send. The graphical user interface may include a button (e.g., an "Analyze Data" button) that, when pressed, causes one or more data analysis functions to be performed. In some aspects, the user may provide additional input about the desired data analysis, such as desired input, desired output, desired granularity, desired time to complete the data analysis, desired time of input data, or the like.

Figure 13:

FIG. 13 depicts an illustrative graphical user interface 1300 of an application that may be used for providing alerts and/or receiving or generating commands for taking corrective action, in accordance with one or more embodiments described herein. The graphical user interface 1300 may include an alert with information about a current state of a piece of equipment, a problem being experienced by a piece of equipment, a problem with a plant, or the like. For example, the graphical user interface 1300 may include one or more alerts, such as an alert that a slide valve is stuck open, that a new hot spot has been detected, that an existing hot spot is growing, or another alert.

The graphical user interface 1300 may include one or more buttons that, when pressed, cause one or more actions to be taken. For example, the graphical user interface 1300 may include a button that, when pressed, causes a slide valve to attempt to open or close. In another example, the graphical user interface 1300 may include a button that, when pressed, sends an alert to a contact (e.g., via a remote device), the alert including information similar to the information included in the alert provided via the graphical user interface. In a further example, the graphical user interface 1300 may include a button that, when pressed, shows one or more other actions that may be taken (e.g., additional corrective actions, such as adjust a hydraulic pressure, adjust a temperature, adjust a flow rate, or the like).

Measuring and Determining Hot Spots

One potential problem that slide valves may be subject to is the formation of hot spots. Hot spots may result in weakening and ultimately failure of the material. Hot spots often result from imperfections introduced during slide valve fabrication, but might not be detectable until the slide valve is in operation. Hots spots generally form where the internals are welded to the body or any section that may contain discontinuities and the bonnet flange and may result from the circulation of gas behind the refractory material that coats the sliding valve components. For example, if hot gas gets behind the protective refractory, skin temperatures can grow to exceed the metallurgical limits.

A typical process may be carried out between about 1275 degrees F. to 1450 degrees F. But many of the problems develop due to thermal cycling where the temperature cycles between low and high temperatures (e.g., between 600 degrees F. and 1275 degrees F.). The extreme change in temperature may cause metal weakening or fatigue. Cracking, deformation, bulging, or other problems may result from a hot spot.

In a cold wall slide valve (such as the one illustrated in FIG. 2), hot spots might form where a stub connects to the wall, and/or at the bonnet section (e.g., 230 in FIG. 2). If the material behind the wall sags or there is circulation behind the refractory material between the material and the wall, a hot spot may result.

Regularly monitoring for hot spots may improve safety and equipment life. A thermal gun may be used to measure slide valve temperatures. Alternatively or additionally, a shielded, tube skin thermocouple assembly may provide a complete temperature profile. Alternatively or additionally, one or more skin thermocouples may be connected to one or more locations on the body or shell of the slide valve to monitor for hot spots. For example, a skin thermocouple may be attached near where the stub connects to the wall and/or near the bonnet section. In some aspects, when a hot spot has been detected, a skin thermocouple may be attached at or near a known hot spot for continued monitoring of that hot spot.

Alternatively or additionally, fiber optic temperature measurements may be taken to detect hot spots. Fiber optic cable can be attached to the line or vessel to provide a complete profile of temperatures.

Tomography may also be used to image the slide valve by sections or sectioning, through the use of any kind of a penetrating wave, such as infrared. One or more thermal cameras may be used (e.g., mounted in one or more fixed locations around a slide valve, attached to a robot that moves around a slide valve, carried by a plant worker) to regularly capture thermal images of a slide valve. The thermal cameras may be mounted in a configuration such that a combination of images from the thermal cameras allow for viewing all exterior portions of a slide valve. Alternatively or additionally, thermal cameras may be mounted so that less than all exterior portions of a slide valve are visible in the thermal images (e.g., thermal imaging might only be taken of areas of the slide valve body that are most likely to develop hot spots). One or more cameras may capture one or more images of the slide valve, which may, in some embodiments, allow for convenient comparison of a thermal image with one or more locations on the slide valve.

Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different spots at different intervals. For example, data at a known hot spot may be collected at a first interval, and data at a spot that is not a known hot spot may be collected at a second interval. Alternatively or additionally, sensor data may be collected based on a particular event occurrence. For example, a thermal cycle event may trigger collection of sensor data from one or more sensors.

Sensor data may be collected by a data collection platform 1002. The sensors may interface with the data collection platform 1002 via wired or wireless transmissions. The data collection platform 1002 may continuously or periodically (e.g., every second, every minute, every hour, every day, once a week, once a month, etc.) transmit collected sensor data to a data analysis platform 1004, which may be nearby or remote from the data collection platform 1002.

The data analysis platform 1004 may analyze sensor data to detect new hot spots and/or to monitor existing hot spots (e.g., to determine if an existing hot spot is growing, maintaining the same size, or shrinking). Temperature data from different dates may be compared to determine if changes are occurring. Such comparisons may be made on a monthly, weekly, daily, hourly, or some other basis.

A hot spot may be detected based on a temperature reading for a certain portion of a slide valve body increasing relative to historical temperatures for that portion of the slide valve body. For example, if a particular spot on the slide valve body is historically around 600 degrees F., based on regular collected temperature data, but then new temperature data shows that the particular spot is starting to increase in temperature (e.g., temperature readings are now around 650 degrees F.), the data analysis platform 1004 may determine that a hot spot is starting to develop.

In some aspects, data from different locations around the slide valve body may be collectively analyzed. For example, if every location or most locations on a slide valve body increase in temperature, the data analysis platform 1004 may determine that the valve is merely running at a higher temperature, and not that a hot spot is developing. In some aspects, the data analysis platform 1004 may monitor for certain spots varying by more than other spots, which may be an indicator of a hot spot. For example, if most locations on a slide valve body increase in temperature by 5%, but a particular spot increases in temperature by 10%, the data analysis platform 1004 may determine that a hot spot is developing in that particular spot.

In some embodiments, data from the sensors may be correlated with weather data at the plant. For example, if a rainstorm is currently happening at the plant, the surface temperature, operating temperature, or another temperature of the slide valve might drop. In another example, if a drought and heat wave are currently happening at the plant, the surface temperature, operating temperature, or another temperature of the slide valve might increase. The data analysis platform 1004 may determine, based on the correlation of the weather conditions to the changes in temperature data, that the changes in temperature of the slide valve are due to weather conditions, and not, e.g., due to a developing hot spot.

In some embodiments, data analysis platform 1004 may determine, based on monitoring data from one or more slide valves at one or more different plants, if certain weather conditions and/or other operating conditions are correlated with development of new hot spots, growth of existing hot spots, or other potential problems with slide valves.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform 1004 may use additional data from the slide valve or from other equipment connected to the slide valve (e.g., in the same plant, in a plant upstream of the plant, etc.) to determine additional information about the hot spot. For example, if a known hot spot being monitored remains the same size or grows at a first rate when a first operating condition exists and the known hot spot remains the same size or grows at a second rate when a second operating condition exists, the data analysis platform 1004 may determine such a correlation by comparing the hot spot data to other data. One or more examples of an operating condition may include, e.g., the plant is operated at a particular efficiency, a particular amount of feed is used, a particular operating temperature of a piece of equipment upstream of the slide valve is maintained, a particular amount of catalyst is used, a particular temperature of catalyst is used, weather conditions, and the like. In some aspects, a particular operating condition or combination of operating conditions may be determined to be more likely to cause development of new hot spots or growth, stability, or stabilization of existing hot spots.

In some aspects, data analysis platform 1004 may determine if a hot spot is approaching a known damage or failure condition. For example, if a slide valve shell is designed to withstand temperatures up to 800 degrees F., and a hot spot is at 775 degrees F. and increasing in temperature, data analysis platform 1004 may determine that the hot spot may soon cause equipment failure. Data analysis platform 1004 may use historical data from the slide valve, data from other slide valves at the plant, data from other plants, data from a manufacturer, specification data, or other data to determine how a hot spot might develop, grow, stabilize, cause failure, or the like.

If a new hot spot is detected, data analysis platform 1004 may take one or more actions. For example, data analysis platform 1004 may trigger an alert to one or more remote devices (e.g., remote device 1, remote device 2). The alert may include information about the hot spot (e.g., temperature of the hot spot, how hot the hot spot is relative to the surrounding area, how long the hot spot has been at a particular temperature, history of the hot spot (e.g., if the hot spot is new or has been there for an amount of time), severity of the hot spot). The alert may provide information about one or more determined correlations between hot spot activity and a particular operating condition or combination of operating conditions. The alert may include one or more recommendations for adjustments to operating conditions, adjustments to slide valve positions or settings, or the like.

In some aspects, a remote device may send a command for a particular action to be taken, which may or may not be based on the alert. In some aspects, data analysis platform 1004 may send a command for a particular action to be taken, whether or not an alert was sent to or a command was sent by the remote device. The command cause one or more actions to be taken, which may mitigate a hot spot, prevent equipment (e.g., slide valve) damage, avoid failure, or the like. For example, if a hot spot rapidly develops, and, based on analyzing the growth rate of the hot spot relative to known failure temperatures, data analysis platform 1004 determines that the hot spot soon will cause a problem over a particular threshold (e.g., over a cost threshold, over a safety threshold, over a risk threshold, or the like), a shutdown command (e.g., a plant shutdown, a process shutdown, a slide valve shutdown, or the like) may be sent to cause a shutdown in order to avoid equipment failure, catastrophic failure, slide valve damage, plant damage, or some other damage.

In some embodiments, (e.g., if the data analysis platform 1004 determines a correlation between one or more operating conditions and a potential problem, such as a higher likelihood to develop new or grow existing hot spots), if the data analysis platform 1004 determines that current operating conditions exist that cause or potentially cause a problem, data analysis platform 1004 may take one or more actions. For example, data analysis platform 1004 may send an alert to a remote device that the potentially problem-causing operating conditions exist. In another example, data analysis platform 1004 may send a command (e.g., to control platform 1006) to take one or more actions (e.g., open a valve, close a valve, change a flow rate, shutdown, or the like) to protect the slide valve from being damaged during the existence of the potentially problem-causing operating condition.

Early detection of hot spots may allow for corrective action to be taken before equipment failure. Data analysis platform 1004 may send an alert to one or more devices at the plant. The alert may include recommendations for changes in operating conditions to make, repairs to make, or the like.

For example, depending on how hot the spot gets, an air ring, a steam ring, and/or a water-mist ring (depending on severity of the hot spot) may be installed to correct or ameliorate a hot spot.

In some embodiments, a connection (e.g., a valve, nozzle) may be added to the body or shell of the valve at the time of fabrication in one or more locations where hot spots might occur (e.g., near the bonnet section). If a hot spot is detected, data analysis platform 1004 may provide a recommendation to inject a substance (e.g., furmanite) via the connection to fill or partially fill the void between the wall and the shell, thereby decreasing or inhibiting the gas circulation causing the hot spot.

In some instances, damage because of hot spots might not be fixable while the valve is in operation (e.g., while the plant is online); however, it would be beneficial to determine at an early stage if hot spots are forming so that corrective action may be taken to extend the life of the slide valve. For example, if a corrective action can be implemented to lessen the severity of the hot spot, it may be possible to continue operating the valve until the next scheduled plant shutdown, when the slide valve may be further repaired or replaced. In some instances, data analysis platform 1004 may provide a recommended action to be taken at a time of a next shutdown. Data analysis platform 1004 may store information about the hot spot, and the next time data analysis platform 1004 receives information indicating that a plant shutdown is scheduled to happen or is happening, data analysis platform 1004 may send an alert or a renewed alert with one or more recommendations for repairs to make during the shutdown, based on the hot spot data collected.

The data taken from one or more of the various sensors may be correlated with weather and environmental data to determine predictive models of potential problems in the current slide valve, and/or other slide valves used in different processes and environments. The data may be taken on a periodic basis. In some embodiments, more data points may enable better predictive outcome (e.g., allowing early prediction of potential failures and/or implementation of preventative measures). For example, if catalyst is hindering the movement between the disc and the guides, the guides may be blasted with water or gas to remove the catalyst.

CONCLUSION

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A system comprising:
   a condenser;
   a regenerator;
   a distillation column;
   a pump;
   a slide valve;
   one or more sensors, the one or more sensors configured to collection temperature information associated with the slide valve;
   a data collection platform comprising:
      one or more processors;
      a first communication interface in communication with the one or more sensors; and
      non-transitory computer-readable memory storing executable instructions that, when executed, cause the data collection platform to:
         receive sensor data from the one or more sensors, the sensor data from the one or more sensors comprising the temperature information associated with the slide valve;
         correlate the sensor data from the one or more sensors with metadata comprising time data, the time data corresponding to the temperature information associated with the slide valve; and
         transmit, to a data analysis platform, the sensor data from the one or more sensors;
   the data analysis platform, comprising:
      one or more processors;
      a second communication interface; and
      non-transitory computer-readable memory storing executable instructions that, when executed, cause the data analysis platform to:
         receive, from the data collection platform, the sensor data from the one or more sensors;
         analyze the sensor data from the one or more sensors;
         based on analyzing the sensor data from the one or more sensors, determine whether a hot spot is developing in the slide valve; and
         based on whether the hot spot is developing in the slide valve, determine a recommended change to a position of the slide valve; and
         transmit, to a control platform, a message configured to cause the recommended change to the position of the slide valve; and
   the control platform comprising:
      one or more processors;
      a third communication interface; and
      non-transitory computer-readable memory storing executable instructions that, when executed, cause the control platform to:
         receive, from the data analysis platform, the message configured to cause the recommended change to the position of the slide valve; and
         cause the recommended change to the position of the slide valve.

2. The system of claim 1, wherein the non-transitory computer-readable memory of the data collection platform stores executable instructions that, when executed, cause the data collection platform to:
   correlate the sensor data from the one or more sensors with the metadata comprising the time data by determining that the temperature information comprises a first temperature of a component of the slide valve at a first time and comprises a second temperature of the component of the slide valve at a second time.

3. The system of claim 1, wherein the non-transitory computer-readable memory of the data analysis platform stores executable instructions that, when executed, cause the data analysis platform to:
  determine an area of the slide valve where the hot spot is developing; and
  send an alert comprising information detailing the area of the slide valve where the hot spot is developing.

4. The system of claim 1, wherein the non-transitory computer-readable memory of the data analysis platform stores executable instructions that, when executed, cause the data analysis platform to:
  receive weather information corresponding to weather at a geographic location of the slide valve;
  correlate the sensor data from the one or more sensors with the weather information corresponding to weather at the geographic location of the slide valve; and
  determine whether the operating condition of the slide valve is associated with the weather at the geographic location of the slide valve.

5. The system of claim 1, wherein the non-transitory computer-readable memory of the data analysis platform stores executable instructions that, when executed, cause the data analysis platform to:
  send a command to the control platform, the command configured to cause the adjustment to the hydraulic pressure associated with the slide valve.

6. The system of claim 1, wherein the one or more sensors comprise a temperature sensor, and
  wherein the non-transitory computer-readable memory of the data analysis platform stores executable instructions that, when executed, cause the data analysis platform to:
    receive sensor data comprising temperature information associated with the slide valve;
    correlate the temperature information with the operating condition of the slide valve; and
    based on the operating condition of the slide valve, send a message configured to cause an adjustment to a position of the slide valve.

7. The system of claim 6, wherein the non-transitory computer-readable memory of the data analysis platform stores executable instructions that, when executed, cause the data analysis platform to:
  determine whether the temperature information associated with the slide valve corresponds to a hot spot in the valve;
  determine a recommendation for correcting the hot spot in the valve; and
  transmit, to a remote device, the recommendation for correcting the hot spot in the valve.

8. A method of plant operation for a plant comprising a condenser, a regenerator, a distillation column, a pump, and a slide valve, the method comprising:
  at a data collection platform comprising one or more processors, memory, and a communication interface in communication with one or more sensors comprising a position sensor associated with the slide valve:
    receiving sensor data from the one or more sensors, the sensor data comprising operation information associated with the slide valve, the sensor data correlated with metadata comprising time data, the time data corresponding to the operation information associated with the slide valve;
    analyzing the sensor data from the one or more sensors;
    based on analyzing the sensor data from the one or more sensors, determining whether a hot spot is developing in the slide valve;
    based on whether the hot spot is developing in the slide valve, determining a recommended change to a position of the slide valve; and
    transmitting, to a control platform, a message configured to cause the recommended change to the position of the slide valve.

9. The method of claim 8, comprising:
  receiving the time data corresponding to the operation information associated with the slide valve, the time data comprising a start time of a movement of a component of the slide valve and a stop time of the movement of the component of the slide valve.

10. The method of claim 8, comprising:
  receiving weather information corresponding to weather at a geographic location of the slide valve;
  correlating the sensor data from the one or more sensors with the weather information corresponding to weather at the geographic location of the slide valve; and
  determining whether an operating condition of the slide valve is associated with the weather at the geographic location of the slide valve.

11. The method of claim 8, comprising:
  sending an alert to a remote device, the alert comprising whether a hot spot is developing in the slide valve.

12. The method of claim 11, comprising:
  receiving, from the remote device, a command to cause an adjustment to the hydraulic pressure associated with the slide valve.

13. The method of claim 8, wherein the one or more sensors comprise a temperature sensor, and
  wherein the method comprises:
    receiving sensor data comprising temperature information associated with the slide valve;
    correlating the temperature information with an operating condition of the slide valve; and
    based on the operating condition of the slide valve, sending a message configured to cause an adjustment to a position of the slide valve.

14. The method of claim 13, comprising:
  determining whether the temperature information associated with the slide valve corresponds to a hot spot in the valve;
  determining a recommendation for correcting the hot spot in the valve; and
  transmitting, to a remote device, the recommendation for correcting the hot spot in the valve.

15. A method of operation for a refinery comprising a condenser, a regenerator, a distillation column, a pump, and a slide valve, the method comprising:
  at a data collection platform comprising one or more processors, memory, and a communication interface in communication with one or more sensors comprising a position sensor associated with the slide valve:
    receiving sensor data from the one or more sensors, the sensor data comprising operation information associated with the slide valve, the sensor data correlated with metadata comprising time data, the time data corresponding to the operation information associated with the slide valve;
    analyzing the sensor data from the one or more sensors;
    based on analyzing the sensor data from the one or more sensors, determining whether a hot spot is developing in the slide valve;

based on whether the hot spot is developing in the slide valve, determining a recommended change to a position of the slide valve; and transmitting, to a control platform, a message configured to cause the recommended change to the position of the slide valve.

16. The method of claim 15, comprising:

receiving the time data corresponding to the operation information associated with the slide valve, the time data comprising a start time of a movement of a component of the slide valve and a stop time of the movement of the component of the slide valve.

17. The method of claim 15, comprising:

receiving weather information corresponding to weather at a geographic location of the slide valve;

correlating the sensor data from the one or more sensors with the weather information corresponding to weather at the geographic location of the slide valve; and determining whether an operating condition of the slide valve is associated with the weather at the geographic location of the slide valve.

18. The method of claim 15, comprising:

sending an alert to a remote device, the alert comprising whether a hot spot is developing in the slide valve.

19. The method of claim 15, wherein the one or more sensors comprise a temperature sensor, and wherein the method comprises:

receiving sensor data comprising temperature information associated with the slide valve;

correlating the temperature information with an operating condition of the slide valve; and based on the operating condition of the slide valve, sending a message configured to cause an adjustment to a position of the slide valve.

20. The method of claim 19, comprising:

determining whether the temperature information associated with the slide valve corresponds to a hot spot in the valve;

determining a recommendation for correcting the hot spot in the valve; and transmitting, to a remote device, the recommendation for correcting the hot spot in the valve.

* * * * *